United States Patent [19]

Kanaegami et al.

[11] Patent Number: 5,297,039
[45] Date of Patent: Mar. 22, 1994

[54] TEXT SEARCH SYSTEM FOR LOCATING ON THE BASIS OF KEYWORD MATCHING AND KEYWORD RELATIONSHIP MATCHING

[75] Inventors: Atsushi Kanaegami; Kazuhiro Koike; Hirokazu Taki; Hitoshi Ohgashi, all of Kamakura, Japan

[73] Assignee: Mitsubishi Denki Kabushiki Kaisha, Tokyo, Japan

[21] Appl. No.: 826,090

[22] Filed: Jan. 27, 1992

[30] Foreign Application Priority Data

Jan. 30, 1991 [JP]  Japan .................................. 3-9861
Sep. 20, 1991 [JP]  Japan .................................. 3-241327

[51] Int. Cl.$^5$ .............................................. G06F 15/40
[52] U.S. Cl. .................................. 364/419.13; 395/63; 395/76
[58] Field of Search ............... 364/419; 395/63, 76

[56] References Cited

U.S. PATENT DOCUMENTS 5,121,481  6/1992  Sasaki et al. ...................... 395/275
5,123,103  6/1992  Ohtaki et al. ...................... 395/600

FOREIGN PATENT DOCUMENTS 61-75952  4/1986  Japan .
1-21624  1/1989  Japan .

OTHER PUBLICATIONS

"Document Retrieval Based on Modification Relations" H. Inagaki, et al. Info Processing Society of Japan . . . pp. 678–679 Oct. 1990.

Primary Examiner—Robert A. Weinhardt
Assistant Examiner—Gita Shingala
Attorney, Agent, or Firm—Wolf, Greenfield & Sacks

[57] ABSTRACT

A text information extraction device extracts analysis networks from texts and stores them in a database. The analysis networks consist of lines each including elements and relations extracted from the texts. The analysis networks are complemented via synonym/near synonym/thesaurus process and via complementary template and the lines thereof are weighted via concept template. A text similarity matching device judges similarity of input and database analysis networks on the basis of agreements of words, word pairs, and lines. A text search system stores texts and complementary term lists prepared therefrom in respective databases. Queries are inputted in the form of analysis networks from which sets of keywords and relations are extracted. After searching the texts and complementary term lists stored in databases with respect to the keywords extracted from each input query, agreements of the sets of keywords and relations are determined.

8 Claims, 7 Drawing Sheets

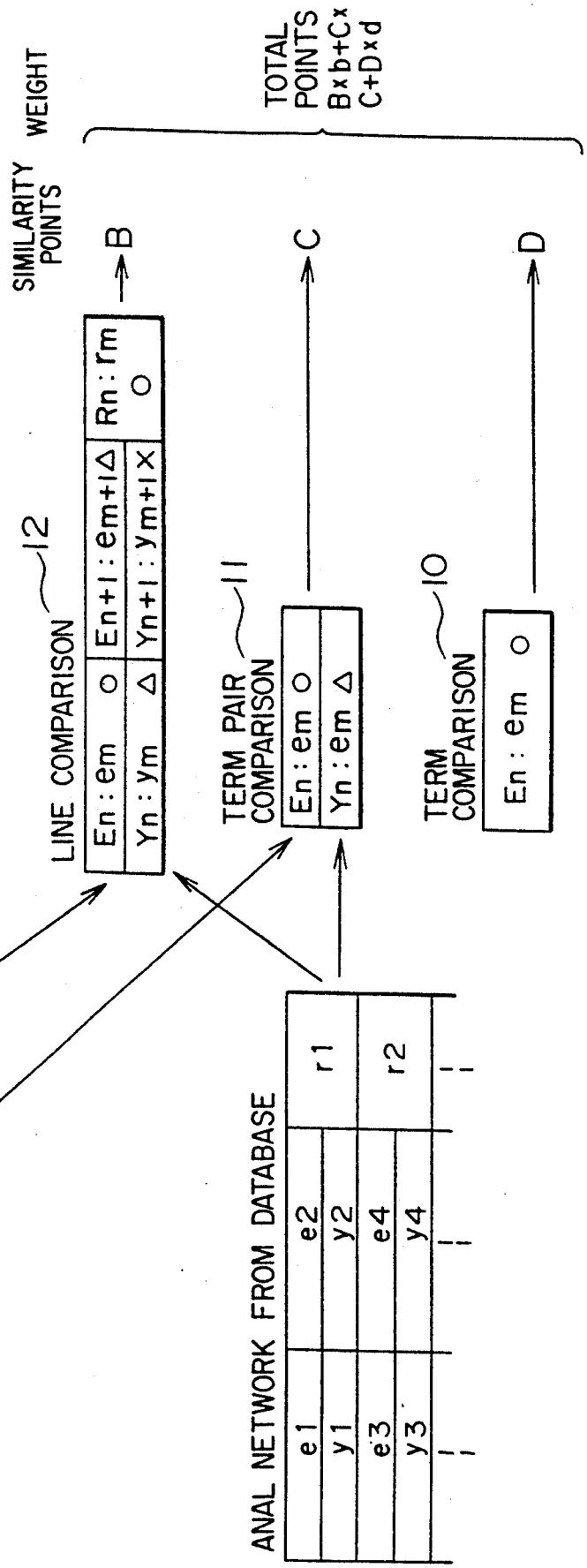
FIG. 4 STRUCTURE SIMILARITY JUDGMENT PROCESS

FIG. 5

INPUT ANALYSIS NETWORK — 20

| K1 | A1 | A2 | V1 |
|---|---|---|---|
|  | B1 | B2 |  |

○ = 2 POINTS    WEIGHT
△ = 1 POINT    b = c = d = 1
× = 0 POINT

ANALYSIS NETWORK A — 21

| K11 | A1 | B3 | V3 |
|---|---|---|---|
|  | B3 | B2 |  |
| K12 | A1 | D1 | U1 |
|  | C1 | C2 |  |

TOTAL POINTS = B×b×C×c×D×d
= 14×1+13×1+8×1
= 35 POINTS

23

TERM COMPARISON
A1  ○ + △ + ○ + × = 5 POINTS  } TERM
A2  △ + △ + △ + × = 3 POINTS  } AGREEMENT POINTS
D = 8 POINTS

TERM PAIR COMPARISON
A1  ○ + △ + ○ + × = 5 POINTS
B1  △ + △ + × + × = 2 POINTS   } TERM PAIR AGREEMENT POINTS
A2  △ + △ + △ + × = 3 POINTS
B2  △ + ○ + × + × = 3 POINTS
C = 13 POINTS

LINE COMPARISON
K1:K11 { ○+△+○+×
         △+△+×+× } + △ = 8 POINTS
K1:K12 { △+△+△+×
         △+○+×+× } + × = 6 POINTS
LINE AGREEMENT POINTS
B = 14 POINTS

ANALYSIS NETWORK B — 22

| K21 | A3 | B1 | V1 |
|---|---|---|---|
|  | B2 | B1 |  |
| K22 | D3 | D2 | V3 |
|  | F1 | F2 |  |

TOTAL POINTS = 11×1+8×1+2×1
= 21 POINTS

24

TERM COMPARISON
A1  △ + × + × + × = 1 POINT  } TERM
A2  △ + × + × + × = 1 POINT  } AGREEMENT POINTS
D = 2 POINTS

TERM PAIR COMPARISON
A1  △ + × + × + × = 1 POINT
B1  △ + ○ + × + × = 3 POINTS  } TERM PAIR AGREEMENT POINTS
A2  △ + × + × + × = 1 POINT
B2  ○ + △ + × + × = 3 POINTS
C = 8 POINTS

LINE AGREEMENT POINTS
K1:K11 { △+×+×+×
         △+○+×+× } + ○ = 6 POINTS
K1:K22 { △+×+×+×
         ○+△+×+× } + △ = 5 POINTS
LINE AGREEMENT POINTS
B = 11 POINTS

TEXT SEARCH SYSTEM FOR LOCATING ON THE BASIS OF KEYWORD MATCHING AND KEYWORD RELATIONSHIP MATCHING

BACKGROUND OF THE INVENTION

This invention relates to text information extraction devices and methods, whereby the information is extracted from texts such as abstracts of technical papers, for classifying the information or obtaining a database therefrom. This invention further relates to text similarity matching devices and text search systems and methods, whereby semantic similarity of texts contained in a database including texts is matched or collated such that similarity information can be searched for in the database to realize reliable and efficient textual information searches.

Examples of databases including texts from which information is searched for include patent literature, technical books and papers. Such information searches are generally effected by one of the three methods: (1) search by means of keywords; (2) search by means of pattern matching of the words of texts; and (3) search method by which semantic similarity of texts are utilized.

Keyword search and pattern matching search are well known. In the case of these search methods by means of words, synonyms and near synonyms are also searched in order to prevent occurrences of oversight. In the case of the search method based on judgments upon semantic similarity of texts, texts may be subjected to morphological analysis (analysis of morphemes) and parsing (syntactical analysis), as taught by Japanese Laid-Open Patent (Kokai) No. 64-21624, such that the words and syntactic relationships therebetween, as well as the synonyms, near synonyms, together with conceptual information of words thus obtained via such analysis, are also searched for. Further, although not based upon semantic similarity judgement search method, an article by Takamatsu, Kusaka, and Nishida: "Automatic Extraction of Relational Information from Technical Abstracts", Journal of Information Processing Society of Japan, vol. 25, No. 2, March 1984, discloses a relevant method for extracting relations of terms from patent abstracts.

Conventional search methods, however, have the following disadvantages.

Keyword searches tend to produce superfluous search results and, on the other hand, to overlook essential results. Thus, analysts who are versed in the keyword system are required to devise an ingenious logical formulae for the keyword search. This is a heavy burden on the analysts.

The search method via semantic similarity judgement is meant to reduce the burden on the analysts. However, this search method has hitherto tried to judge semantic similarity on the basis of the conceptual meanings of words. The conceptual meanings or concepts of words, however, can be understood only by a small number of people, and clear definitions of concepts are difficult to give. In addition, it is not clear how such concepts of words should affect the semantic similarity judgments.

In order to obtain good semantic similarity judgments, concepts appearing in the process must be clarified one by one by human analysts. Thus, such search method can practically be implemented only for a small amount of text. For a large database such as patent literature, an inordinate amount of time and labor are required for practicing such search method, since the search system must usually be constructed by a small number of system developers. Thus this search method is not practical.

SUMMARY OF THE INVENTION

It is therefore an object of this invention to provide a text information extraction device and method for automatically extracting information contents of texts and for outputting the obtained information as information structures called analysis networks such that accurate and reliable search can be easily implemented. Further, this invention aims at providing a text similarity matching device and method for constructing databases from the analysis networks thus obtained, whereby flexible semantic similarity judgments can be effected with respect to the databases. Further, this invention aims at obtaining a text search system which is reliable and efficient even for a large-scale database.

The first object is accomplished in accordance with the principle of this invention by a text information extraction device which comprises:

(a) an input means via which a text is input;

(b) an expansion means for analyzing each input text and extracting elements and relations between said elements contained in the text, thereby preparing an analysis network representing information on the respective elements and relations which hold therebetween;

(c) related words dictionary storing related words of predetermined terms;

(d) related word processing means for adding related words of each element to said analysis network when an agreement is found between the element of said analysis network and one of said predetermined terms stored in said related word dictionary;

(e) output means for outputting said analysis network to a storage or display device.

Preferably the related word dictionary is a synonym/near synonym dictionary or a thesaurus. According to a preferred aspect, the text information extraction device comprises:

(a) an input means via which a text is input;

(b) an expansion means for analyzing each input text and extracting elements and relations between said elements contained in the text, thereby preparing an analysis network representing information on the respective elements and relations which hold therebetween;

(c) related words dictionary storing related words of predetermined terms;

(d) related word processing means for adding related words of each element to said analysis network when an agreement is found between the element of said analysis network and one of said predetermined terms stored in said related word dictionary;

(e) a concept template storing technical information related to texts which are to be input via said input means, said concept template storing said technical information in a form of lines consisting of elements and relations holding therebetween (f) a complementary template storing complementary information on predetermined terms, said complementary template storing said complementary information in a form of predetermined terms and lines consisting of elements and relations which are related to said predetermined terms;

(g) matching means for matching each line of said analysis network prepared by said expansion means with respective lines of said concept template, so as to mark each line of said analysis network matching a line of said concept template;

(h) complementing means for complementing said analysis network when an agreement is found between an element of said analysis network prepared by said expansion means and a term stored in said complementary template, said complementing means adding each line related to said term to said analysis network; and (i) output means for outputting said analysis network to a storage or display device.

The text information extraction method according to this invention comprises the steps of:

(a) inputting a text;

(b) analyzing the input text by means of a dictionary and preparing an analysis network consisting of at least one line which includes at least one element consisting of a noun extracted from the text and a relation consisting of a verb extracted from the text;

(c) adding related words of said element to said analysis network by means of a related word dictionary, thereby generating an complemented analysis network; and (d) outputting said complemented analysis network.

The text information extraction method according to a preferred aspect of this invention comprises the step of:

(a) preparing and storing a concept template comprising lines each consisting of elements and relations holding therebetween;

(b) preparing and storing a complementary template comprising predetermined terms and lines of elements and relations related to said terms;

(c) inputting a text;

(d) analyzing the input text by means of a dictionary and preparing an analysis network consisting of at least one line which includes at least one element consisting of a noun extracted from the text and a relation consisting of a verb extracted from the text;

(e) adding related words of said element to said analysis network by means of a related word dictionary;

(f) matching each line of said analysis network with each line of said concept template, so as to mark each line matching a line of said concept template;

(g) determining whether or not an agreement is found between each element of a line of said analysis network and said predetermined terms of said complementary template, wherein each line of elements and relations related to a term of said complementary template which is in agreement with an element of said analysis network is added to said analysis network; and (h) outputting said analysis network.

The text similarity matching device according to this invention comprises:

(a) analysis network database storing analysis networks each comprising at least one line consisting of elements and relations between elements extracted from texts;

(b) analysis network input means for inputting an input analysis network of a text with respect to which said analysis network database is to be searched, said input analysis network comprising at least one line consisting of elements and relations between elements;

(c) similarity judgment means for judging similarity of said input analysis network and each one of the analysis networks stored in said analysis network database, said similarity judgment means judging similarity between analysis networks on the basis of agreements between elements and relations of respective lines of analysis networks; and (d) output means for outputting a result of judgment of said similarity judgment means.

Preferably the similarity judgment means includes:

(c1) means for giving points to respective agreements between elements and relations of respective lines of analysis network;

(c2) means for weighting said points; and (c3) means for taking a sum of said points weighted by said weighting means, said similarity judgment means judging similarity between analysis networks on the basis of said sum of weighted points.

The text similarity matching method according to this invention comprises the steps of:

(a) preparing analysis networks each comprising at least one line consisting of elements and relations between elements extracted from at least one text;

(b) inputting an input analysis network of a text with respect to which said analysis network database is to searched, said input analysis network comprising at least one line consisting of elements and relations between elements;

(c) judging similarity of said input analysis network and each one of the analysis networks stored in said analysis network database, said similarity judgment means judging similarity between analysis networks on the basis of agreements between elements and relations of each line of said analysis network; and (d) output means for outputting a result of judgment of said similarity judgment means.

Preferably, the similarity judging step includes the steps of:

(c1) giving points to respective agreements between elements and relations of respective lines of analysis network;

(c2) weighting said points; and (c3) taking a sum of weighted points, judgment of similarity between analysis networks being based on said sum of weighted points.

The text search system according to this invention comprises:

(a) text database storing texts to be searched;

(b) a complementary term list database storing complementary term lists obtained from said texts via morphological analysis, each complementary term list including lexically divided words of a text and terms related to said words;

(c) query analysis means for receiving an input query and outputting sets of keywords and relations between keywords contained in said input query;

(d) first search means for searching said text database with respect to said keywords obtained by said query analysis means, said first search means counting frequency of said keywords in respective texts stored in said text database and outputting texts in which said keywords occur at a frequency a predetermined level;

(e) second search means for searching said complementary term list database with respect to said keywords obtained by said query analysis means, said second search means calculating similarity points of respective complementary term lists on the basis of weighted sum of frequency of said keywords in said respective complementary term lists, said second search means outputting complementary term lists having similarity points above a predetermined level;

(f) complementary term list generating means for generating complementary term lists of texts in response to said texts outputted from said first search means; and (g) third search means for searching among complementary term lists outputted from said second search means or said complementary term list generating means, for occurrences of said sets of keywords and relations outputted from said query analysis means.

Preferably the text search system further comprises:

(h) similarity judgment means for judging similarity of sets of keywords and relations by means of syntactical and semantic analysis, said similarity judgment means judging similarity between sets of keywords and relations outputted from said query analysis means and sets of keywords and relations which are found by said third search means in complementary term lists outputted from said second search means or said complementary term list generating means.

Preferably the first search means includes means for adding synonyms/near synonyms to said keywords and counts frequency of said keywords and said synonyms/near synonyms thereof in respective texts stored in said text database.

The text search system according to this invention comprises:

(a) keyword means for extracting keywords by means of morphological analysis from at least two texts to be matched;

(b) related word means for adding related words, such as synonyms/near synonyms/thesaurus, to said keywords extracted from at least one of said texts so as to add said related words to said keywords as complementary keywords, said related words having a different degree of similarity to said keywords;

(c) judgment means for judging agreement of the keywords of one of said two texts with keywords of the other one of said two texts; and (d) evaluation means for evaluating similarity of keywords judged by said judgment means to agree with each other, said evaluation means including at least one of:

(d1) first evaluation means for changing weights of degrees of similarity in accordance with whether respective keywords judged by said judgment means to agree with each other are keywords extracted by said keyword means or keywords added by said related word means;

(d2) second evaluation means for changing weights of degrees of similarity when said agreements of keywords are partial agreements such as forward, backward, and middle partial agreements, or (d3) third evaluation means for changing weights of degrees of similarity in accordance with points of importance given beforehand to said keywords.

The text analysis device according to this invention comprises:

(a) database for storing texts;

(b) text analysis means for effecting morphological analysis on said texts to obtain lexically divided words from said texts, and adding related words, such as synonyms/near synonyms/thesaurus, to said divided words repetitively an arbitrary number of times so as to output complementary term lists of said texts including said related words added to said divided words; and (c) complementary term list database for storing said complementary term lists received from said text analysis means.

The query analysis device according to this invention comprises:

(a) input means for inputting analysis networks each representing a query in a form of elements and relations between elements, said elements and relations including texts;

(b) morphological analysis means for effecting morphological analysis on said texts of said elements and relations of respective analysis networks, thereby obtaining lexically divided words from said texts, said morphological analysis means outputting analysis network including elements and relations which are divided into words;

(c) related word processing means for adding terms related to said words obtained by said morphological analysis means, said related word processing means outputting analysis network including elements and relations divided into words to which said related terms are added;

(d) extraction means for extracting sets of keywords and relations from said analysis networks outputted from said morphological analysis means or said related word processing means, said sets of keywords and relations forming a search condition.

According to a preferred aspect of this invention, the query analysis device comprises:

(a) input means for inputting analysis networks each representing a query in a form of elements and relations between elements, said elements and relations including texts;

(b) morphological analysis means for effecting morphological analysis on said texts of said elements and relations of respective analysis networks, thereby obtaining lexically divided words from said texts, said morphological analysis means outputting analysis network including elements and relations which are divided into words;

(c) related word processing means for adding terms related to said words obtained by said morphological analysis means, said related word processing means outputting analysis network including elements and relations divided into words to which said related terms are added;

(d) extraction means for extracting sets of keywords and relations from said analysis networks outputted from said morphological analysis means or said related word processing means, said sets of keywords and relations forming a search condition.

(e) complementary template for storing terms or relations for complementing predetermined terms or relations; and (f) query complementing means for adding relations or terms stored in said complementary template to said analysis networks extracted from said texts by said morphological analysis means, said query complementing means adding relations or terms stored in said complementary template when agreements are found between relations or keywords extracted from said analysis networks by said extraction means and relations or terms stored in said complementary template.

BRIEF DESCRIPTION OF THE DRAWINGS

The features which are believed to be characteristic of this invention are set forth with particularity in the appended claims. The structure and method of operation of this invention itself, however, will be best understood from the following detailed description, taken in conjunction with the accompanying drawings, in which:

FIG. 4 is a diagram showing a method of similarity judgment via the similarity judgment means;

FIG. 5 shows a specific method for calculating the total points;

In the drawings, like reference numerals represent like or corresponding parts or portions.

DETAILED DESCRIPTION OF THE PREFERRED EMBODIMENTS

Referring now to the accompanying drawings, the preferred embodiments of this invention are described. First text information extraction devices and methods are described.

TEXT INFORMATION EXTRACTION DEVICES AND METHODS

The first embodiment is described with respect to the analysis network and the system organization. The analysis network is a tabular representation of technically essential points comprised in technical literature such as abstracts of patents. As an example, the analysis network for representing the structure of semiconductor devices extracted from technical literature is explained.

TABLE 1 shows the conceptual structure of an analysis network according to this invention.

TABLE 1

STURUCTUR OF ANALYSIS NETWORK

| relation | element 1 | element 2 |
|---|---|---|
| on | substrate | polycrystalline semiconductor layer |
| refinement | MOS | — |
| high integration | MOS | — |
| use | poly-Si film | — |
| utilization | self-matching technology | — |

More specifically, TABLE 1 shows relationships between elements of a certain structure of a semiconductor device. For example, the first line in the table shows that a polycrystalline semiconductor layer is disposed on a substrate. The second and third lines show that the MOS (metal-oxide-silicon) is refined (line 2) and highly integrated (line 3). The fourth line shows the use of a poly-silicon film. The fifth line shows that the self-matching technique is applied in fabrication of the semiconductor device. As exemplified by TABLE 1, the analysis network is a tabular representation of the technical information such as the structural characteristics of semiconductor devices.

Figure 1:
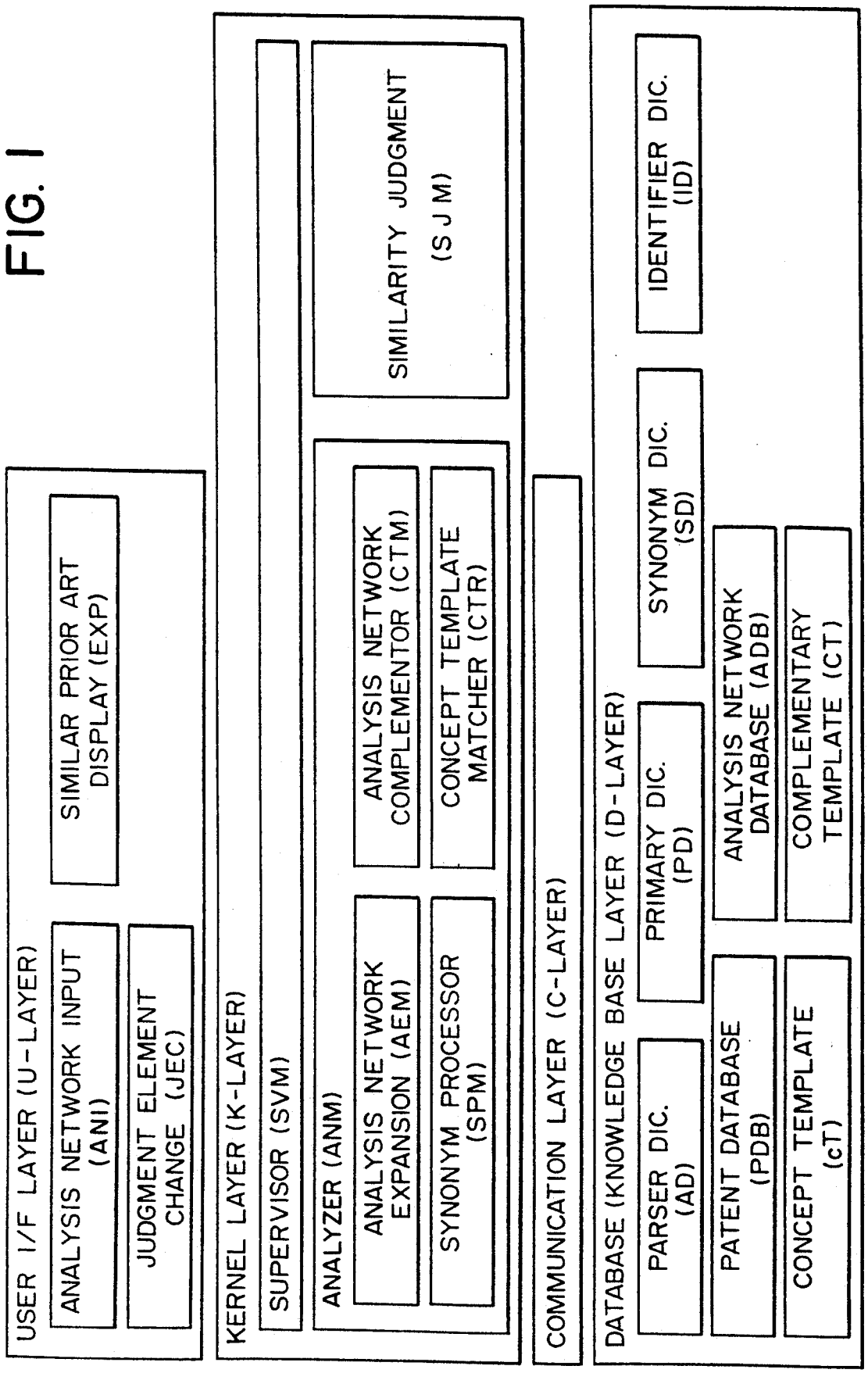
FIG. 1 shows the system organization of the information processing device according to this invention.

FIG. 1 shows the system organization of the information processing device according to this invention. The system consists of four main layers: a user interface layer (U-layer), a kernel layer (K-layer), a communication layer (C-layer), and a database/knowledge base layer (D-layer). The user interface layer (U-layer) includes: a analysis network input unit (ANI) for receiving inputs for searched objects from a user; a judgment element change unit (JEC) for giving weights upon the analysis network at the time of judgments; and similar prior art display or expression unit (EXP) for displaying the result of the searches. The kernel layer (K-layer) consists of: supervisor means (SVM), analysis means (ANM), and similarity judgment means (SJM). Further, the analyzer means (ANM) consists of: analysis network expansion means (AEM), synonym/near synonym processing means (SPM), analysis network complementing means (CTM), and concept template matching (or relating) means (CTR).

The supervisor means (SVM) effects management of the communication to and from the user interface layer (U-layer) and the management of the resources and the control of the kernel layer (K-layer). The analysis network expansion means (AEM) generates the analysis networks of claims and prior art of patent literature. The generation of the claim analysis network is effected by adding synonym/near synonym to the claim analysis network made manually by a human analyst, or automatically by an automated preparation of a claim analysis network from claim abstracts of patents. The generation of the prior art analysis networks is effected by automatic preparation of prior analysis networks from abstracts of the prior art patents, etc. The analysis network complementor means (CTM) complements the analysis network by adding expert knowledge to the original analysis network generated by the analysis network expansion means (AEM).

The communication layer (C-layer) controls the communication with respect to the dictionaries, expert knowledge, and other analysis data between the database/knowledge base layer (D-layer) and the kernel layer (K-layer).

The database/knowledge base layer (D-layer) includes: syntax analysis dictionary (AD), primary dictionary (PD), synonym/near synonym dictionary (SD), term identification dictionary (ID), concept template (cT), complementary template (CT), patent database (PDB), and analysis network database (ADB).

The syntax analysis dictionary (AD) is a dictionary for identifying lexical units (i.e., words) in the texts of the abstracts, etc, the syntax analysis dictionary (AD) is provided with the information with respect to respective parts of speech. The nouns maintained by the syntax analysis dictionary (AD) include general as well as technical terms appearing in the field of the prior art.

The primary dictionary (PD) is a dictionary for maintaining technical terms in the technical field in which the search is made. Other dictionaries (syntax analysis dictionary (AD), synonym/near synonym dictionary (SD), and term identification dictionary (ID)) are prepared on the basis of the primary dictionary (PD).

Synonym/near synonym dictionary (SD) includes synonyms and near synonyms of the general and technical terms. The term identification dictionary (ID) is a dictionary for classifying the circumstances, such as structure, method of production, and material, under which the technical terms appear. The concept template (cT) is a kind of expert knowledge representing the concepts which are regarded by experts as important or common knowledge of those skilled in the art of the relevant field.

The concept template (cT) is utilized for determining the degree of importance of the concepts of the analysis network obtained from the abstracts. TABLE 2 shows an example of a concept template (cT) representing the structural concept of a semiconductor device

TABLE 2

| | CONCEPT TEMPLATE (cT) | |
|---|---|---|
| relation | element 1 | element 2 |
| on | monocrystalline Si film | monocrystalline insulatior film |
| on | substrate | polycrsitalline semiconductor layer |
| within | insulator substrate | gate electrode |
| multiple | connection pad | silicon film |
| expose | pad vertex | — |
| form | switching transistor | silicon film |
| : | : | : |
| : | : | : |
| : | : | : |

The relevant concepts are the relations (such as "on" and "within") between the elements of the structure and the states (such as "multiple" and "expose") of elements. Each line of the concept template (cT) table consists of elements (elements 1 and 2) and their relation or state which appear in the first column in the table.

As in the case of the concept template (cT), the complementary template (CT) represents expert knowledge which are regarded as important or as common knowledge by experts. The difference between the complementary template (CT) and the concept template (cT) is that the complementary template (CT) represents concepts which expand and complement, utilizing technical terms as keywords, the connotations of the technical terms appearing in analysis network by means of the common knowledge of experts in the field. The following TABLE 3 shows an example of a complementary template (CT).

TABLE 3

| | COMPLEMENTARY TEMPLATE (CT) | | |
|---|---|---|---|
| keyword | relation | element 1 | element 2 |
| poly-Si film | use | gate electrode | — |
| | form | monosilane | — |
| | process | poly-Si | polycrystalline |
| | reduction of resistance | gate electrode | |
| | insulation | poly-Si film | — |
| silicon film | oxidation | SiO2—SiO | silicon |
| : | : | : | : |
| : | : | : | : |
| : | : | : | : |
| : | : | : | : |
| self-matching technology | unnecessary | mask matching | — |
| | — | gate electrode | poly-Si |
| | form | gate electrode | — |

In TABLE 3, the keywords shown at the left most column are the structural technical terms of semiconductor devices. For each keyword, relations and the elements are tabulated.

For example, the keyword at the top of TABLE 3, poly-Si film, is complemented with respect to several relations—use, formation, process, mask matching, and reduction of resistance—and the elements for which the respective relations hold. The complementary template (CT) may also be prepared with names of production methods or names of materials as keywords.

The patent database (PDB) maintains the technical materials which include texts and the keywords added to the texts. The analysis network database (ADB) maintains the analysis networks obtained after preliminary analysis of the texts of the prior art material, together with the judgment results obtained after the similarity judgments with respect to the prior art and the respective searched art. The judgment results include similarity points and the information with respect to the reason of similarity judgments.

Next, the method of operation of the text information extraction device according to the first embodiment of this invention is described.

Figure 2:
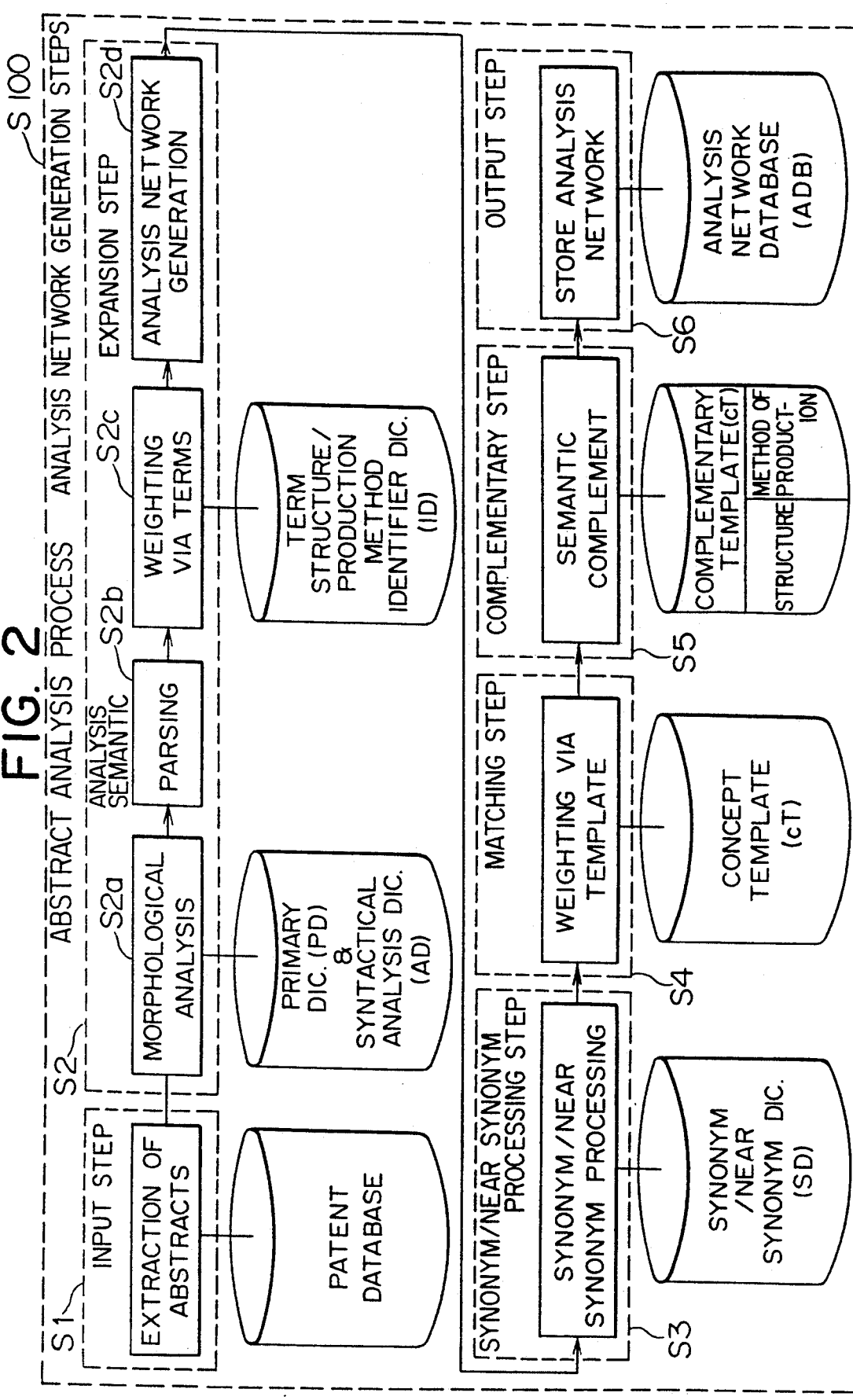
FIG. 2 is a block diagram showing the operations of a text information extraction device according to this invention, by which analysis networks are prepared from a patent database.

FIG. 2 is a block diagram showing the operations of a text information extraction device according to this invention, by which analysis networks are prepared from a patent database. Abstracts of patents stored in the patent database (PDB) are subjected to information extraction procedure and analysis networks are prepared. TABLES 4 through TABLE 8 exemplify the analysis network generation by means of the process shown in FIG. 2. More specifically, the following TABLE 4A and TABLE 4B show an example of the input sentences.

TABLE 4A

INPUT SENTENCE (ENGLISH VERSION)

By forming switching transistors, which are constituent elements of a memory cell, upon a silicon film on an insulator layer, software errors are eliminated by fundamental means, or are reduced drastically.

In TABLE 4B, the English translations are inserted in brackets, and literal translations are inserted within parentheses.

TABLE 4B

INPUT SENTENCE (JAPANESE VERSION)

Memory cell no [meory cell's] kouseiyouso no [constitutent element] switching transistor wo [postposition 'wo' being attached to the noun phrase 'switching transistor' to mark it as an object of a succeeding verb] zetuenso jo no [on an insulator layer] silicon-maku jou ni [on a silicon film] keiseisuru kotoniyori [by forming] (= by forming switching transistors on an insulator layer on a silicon film which are constituent elements of a memory cell), soft error wo [sofware errors, marked by postposition 'wo' to be an object of a succeeding verb] genritekini jokyosuru ka [eliminate by fundamental means], aruiwa [or] oohabani [drastically] teigen dekiru [may be reduced] younisuru [it is done such that] (= it is done such that software errors may be eliminated by fundamental means, or reduced drastically).

TABLE 5A and TABLE 5B show the morphologically parsed list of words obtained from the input sentence. The parts of speech of respective words are identified in the list. TABLE 5A shows the English version.

TABLE 5A

WORD LIST WITH PARTS OF SPEACH (ENGLISH VERSION)
n = noun or noun Phrase
v = verb or verb phrase
o = other

[[(o, 'by'), (v, 'form'), (n, 'switching transistors'), (comma, ',')]
[(o, which), (v, be), n, 'constituent element'),
(o, 'of'), (o, 'a'), (n, 'memory cell'), (comma, ',')
[(o, 'upon'), (o, 'a'), (n, 'silicon film')]
[(o, 'on'), (o, 'a'), (n, 'insulator layer'), (comma, ',']
[(n, 'software error')],
[(v, 'be eliminated'), (o, 'by'), (n, 'fundamental means')]
[(o, 'or')],
[(v, 'be reduced'), (o, 'drastically')]]

Further, TABLE 5B shows the Japanese version of the lexically divided word list.

TABLE 5B

WORD LIST WITH PARTS OF SPEECH (JAPANESE VERSION)
n = noun; v = verb; o = other

[[(n, 'memory cell'), (o, 'no')],
[(n, 'kouseiyouso'), (o, 'no')],
[(n, 'switching transistor') (o, 'wo')],
[(n, 'zetuenso'), (o, 'jo'), (o, 'no')],
[(n, 'siliconmaku'), (o, 'jou'), (o, 'ni')],
[(v, 'keisei'), (o, 'kotoniyori')],
[(n, 'sofuto error'), (o, 'wo')],
[(o, 'genritekini')]
[(v, 'jokyo'), (o, 'ka'), (comma, ',')],
[(o, 'aruiwa')],
[(o, 'oohabani')],
[(v, 'teigen'), (o, 'dekiru'), (o, 'younisuru')]]

TABLE 6A and TABLE 6B show the originally obtained lines of analysis network. TABLE 6A is the English version.

TABLE 6A

ORIGINAL ANALYSIS NETWORK (ENGLISH VERSION)

| relation | element 1 | element 2 |
|---|---|---|
| form | switching transistor | *silicon film |
| eliminate | software error | — |
| on | insulator layer | *silicon film |

TABLE 6B is the Japanese version of the originally obtained analysis network.

TABLE 6B

ORIGINAL ANALYSIS NETWORK (JAPANESE VERSION)

| relation | element 1 | element 2 |
|---|---|---|
| keisei | switching transistor | *siliconmaku |
| jokyo | sofuto error | — |
| jou | zetuenxo | *siliconmaku |

TABLE 7 shows the English version of the analysis network which is obtained via additions of synonyms and near synonyms.

TABLE 7

ANALYSIS NETWORK AFTER ADDITIONS VIA SYNONYMS

| relation | element 1 | element 2 | concept template |
|---|---|---|---|
| form | switching transistor | *silicon film | ○ |
| form | switching transistor | silicon layer | |
| eliminate | sofware error | — | |
| on | insulator layer | *silicon film | ○ |
| on | insulator layer | silicon layer | |

Further, TABLE 8 shows the complemented analysis network. The English version is shown.

TABLE 8

COMPLEMENTED ANALYSIS NETWORK

| relation | element 1 | element 2 | concept template |
|---|---|---|---|
| form | switching transistor | *silicon film | ○ |
| form | switching transistor | silicon layer | |
| eliminate | sofware error | — | |
| on | insulator layer | *silicon film | ○ |
| on | insulator layer | silicon layer | |
| oxidation | SiO2.SiO | silicon film | |

At the input step S1 in FIG. 2, an input sentence is extracted from a patent database (PDB) in which the input sentences (eg, abstracts of patents) are stored as records.

The expansion step S2 includes steps S2a through S2d. At step S2a, the input sentence extracted at the input step S1 is subjected to the morphological analysis by means of the primary dictionary (PD) and syntax analysis dictionary (AD). The TABLE 5A and TABLE 5B show the analysis network as obtained via the morphological analysis at step S2a. The text is lexically divided into nouns, verbs, and other parts of speach. The syntactically functional words appearing in the Japanese word list of TABLE 5B, which correspond to English prepositions, etc, are summarized below:

The postposition "no" roughly corresponds to English preposition "of". It is attached to a noun to indicate possession, equality, etc, with respect to a subsequent noun. The postposition "wo" is attached to a noun to indicate that the noun is an object of a transitive verb which follows it. The word "jo" is attached to a noun to indicate a positional relation represented in English by the prepositions "on" or "above". The postposition "ka", corresponding to the English word "or", is attached to a verb to indicate an alternative.

Next at step S2b, the analysis network is subjected to the syntactical analysis (parsing).

In the case of the Japanese version shown in TABLE 5B, the syntactical analysis selects nouns which have a postposition "wo" (which forms a syntactical phrase unit, "bunsetsu", together with a preceding noun and indicates that the noun is an object of a succeeding verb) and "ni" (which postposition forms the syntactical phrase unit, "bunsetsu", with a preceding noun and indicates that the action of a succeeding verb is directed toward the noun) within the same syntactical phrase unit, "bunsetsu". The phrase units, "bunsetsu", are shown on respective single lines in TABLE 5B.

The syntactical analysis selects further the verbs positioned after respective nouns with "wo" and "ni", which verbs are syntactically connected with respective nouns. Each verb, a noun with "wo" (referred to hereinafter as "wo-noun"), and a noun with "ni" (referred to hereinafter as "ni-noun"), grammatically connected to each other, are labeled as relation, element 1, and element 2 to obtain each one of the lines of analysis network of TABLE 6B.

For example, from the input sentence of TABLE 4B are selected: "switching transistor" as the "wo-noun", "siliconmaku [silicon film]" as the "ni-noun", which are grammatically connected with the verb "keisei [form]". Thus, "switching transistor" and "siliconmaku [silicon film]" are labeled as the element 1 and 2, respectively, for the relation "keisei [form]", thereby forming the first line of the analysis network of TABLE 6B.

Further, at "weighting via terms" steps S2c, an asterisk mark * is attached to the nouns and verbs of the line which are found within the term identification dictionary (ID). Further, at step S2d, the relation, element 1, and element 2 thus obtained are stored as a line of the analysis network as shown in TABLE 6A and 6B. The original analysis network, as shown in TABLE 6A or TABLE 6B, is thus obtained at the expansion step S2.

At the synonym/near synonym processing step S3, new lines are added via the synonym/near synonym processing. Namely, when synonyms/near synonyms of the nouns and verbs stored in the analysis network of TABLE 6A or 6B exist within the synonym/near synonym dictionary (SD) new lines are formed by substituting the synonym/near synonym of the synonym/near synonym dictionary (SD) in the original lines, and the new lines thus obtained are added to the analysis network. TABLE 7 shows the analysis network obtained via this synonym/near synonym process.

At the matching step S4, it is checked wether or not a triplet of the relation, element 1, and element 2, of the respective lines in the analysis network as shown in TABLE 7 is present within the concept template (cT). If the triplets of the respective lines of the analysis network are found within the concept template (cT), a circle (is placed at the last column in the analysis network as shown in TABLE 7. In the case of the example shown in TABLE 7, the concept template (cT) includes the triplet of "form", "switching transistor", and "silicon film", such that the corresponding lines in the analysis network of TABLE 7 are marked by a circle.

Next, at the complementary step S5, the addition of lines via complementary template (CT) is effected as the last process step. In the case of this example, the keyword "silicon film" is present within the complementary template (CT), such that the line: "oxidation, Si-O₂/SiO, silicon film", is added to the complemented analysis network of TABLE 8 as the expert knowledge to complement the analysis network of TABLE 7. The information extraction process with respect to an input sentence is thus completed and the final complemented analysis network of TABLE 8 is prepared.

The input sentence extracted from the patent database (PDB) is thus converted into complemented analysis network of TABLE 8. At the output step S6, the complemented analysis network is stored in the analysis network database (ADB). In a manner similar to the above described procedure, the patent abstracts contained in the patent database (PDB) are processed successively via steps S1 through S5 and the obtained analysis networks are stored at the output step S6 in the analysis network database (ADB).

The following TABLE 9A and TABLE 9B show another embodiment of analysis network generation. TABLE 9A shows an example of the input sentence.

TABLE 9A

INPUT SENTENCE a polycrystalline semiconductor layer is on a substrate, and MOS device is refined and subjected to high integration without reducing reliability, utilizing poly-Si film and making use of self-matching technology.

Further, TABLE 9B shows the complemented analysis network. Which is obtained from the input sentence of the TABLE 9A.

TABLE 9B

| structural line | | relation | element 1 | element 2 | cT | CT |
|---|---|---|---|---|---|---|
| K1 | literal | use | poly-Si film | — | — | with |
| | synonym | — | — | — | — | additions |
| | near-synonym | — | — | — | — | via |
| K2 | literal | utilize | self-match. technology | — | — | synonym & |
| | synonym | — | — | — | — | near |
| | near-synonym | — | — | — | — | synonym |
| K3 | literal | down | reliability | — | — | |
| | synonym | reduction | — | — | — | |
| | near-synonym | reduction | — | — | — | |
| K4 | literal | high integration | MOS device | — | — | |
| | synonym | — | — | — | — | |
| | near-synonym | — | — | — | — | |
| K5 | literal | on | substrate | polycrystalline semiconductor layer | ○ | — |
| | synonym | — | — | — | — | |
| | near-synonym | — | — | — | — | |
| K6 | literal | use | gate electrode | — | K1 | complements via |
| | synonym | — | — | — | — | poly-Si |
| | near-synonym | — | — | — | — | film |
| K7 | literal | form | mono-silane | — | K1 | |
| | synonym | — | — | — | — | |
| | near-synonym | — | — | — | — | |
| K8 | literal | process | poly-Si | polycrystalline | K1 | |
| | synonym | — | — | — | — | |
| | near-synonym | — | — | — | — | |
| K9 | literal | reduce resistance | gate electrode | | K1 | |
| | synonym | — | — | — | — | |
| | near-synonym | — | — | — | — | |
| K10 | literal | insulate | poly-Si film | | K1 | |
| | synonym | — | — | — | — | |
| | near-synonym | — | — | — | — | |
| K11 | literal | not necessary | mask matching | | K2 | complements via |
| | synonym | — | — | — | — | self |
| | near-synonym | — | — | — | — | matching |
| K12 | literal | — | gate electrode | poly-crystalline Si | K2 | technology |
| | synonym | — | — | — | — | |
| | near-synonym | — | — | — | — | |

In the case of the first embodiment described above, a new line is added whenever a synonym/near synonym is present within the synonym/near synonym dictionary (SD) at the synonym/near synonym processing. However, in the case of the embodiment shown in TABLES 9A and 9B, each one of the lines K1 through K12 includes fields for "literal", "synonym", and "near synonym", and, when a synonym or a near synonym is present within the synonym/near synonym dictionary (SD), these fields are filled in. The literal words extracted from the input sentence are written into the field for the "literal".

As in the case of the first embodiment, the processing of the input sentence of TABLE 9A proceeds in accordance with the procedure shown in FIG. 2. The analysis network obtained via the process steps up to the matching step S4 is shown at K1 through K5. The column for concept template (cT) in the line K5 is marked with a circle (which indicates that the relation/elements triplet of the line is found within the concept template (cT).

Further, lines K6 through K10 are complementations from the complementary template (CT) of TABLE 3 via the keyword "poly-Si film" in the line K1. Thus, the last columns in the lines K6 through K10 are marked with "K1" to indicate that they are complementations via the line K1. Further, lines K11 and K12 are complementations via the keyword "self-matching technology". Thus, the last columns in the lines K11 and K12 are marked with "K2" to indicate that they are complementations via the line K2.

The following TABLE 10 shows still another example of an analysis network.

TABLE 10

| element 1 use 1 | element 2 use 2 | relation |
| --- | --- | --- |
| insulator substrate substrate | gate electrode electrode | within |
| channel communication line | gate electrode terminal | on |
| : : | : : | : |

In the case of the analysis network shown in TABLE 10, the columns for the elements 1 and 2 include fields for the uses therefor. By adding the uses in addition to the structural relations, the relationships between the elements are rendered more clear and more akin to the methods by which human analysts analyzes the information.

For example, in the case of the example shown in TABLE 10, the insulator substrate is marked with the use as a substrate and the gate electrode is marked with the use as an electrode (the first line of the table). In the second line, the channel is marked with the use for communication lines, and the gate electrode is marked with the use as a terminal.

TEXT SIMILARITY MATCHING DEVICES AND METHODS

Figure 3:
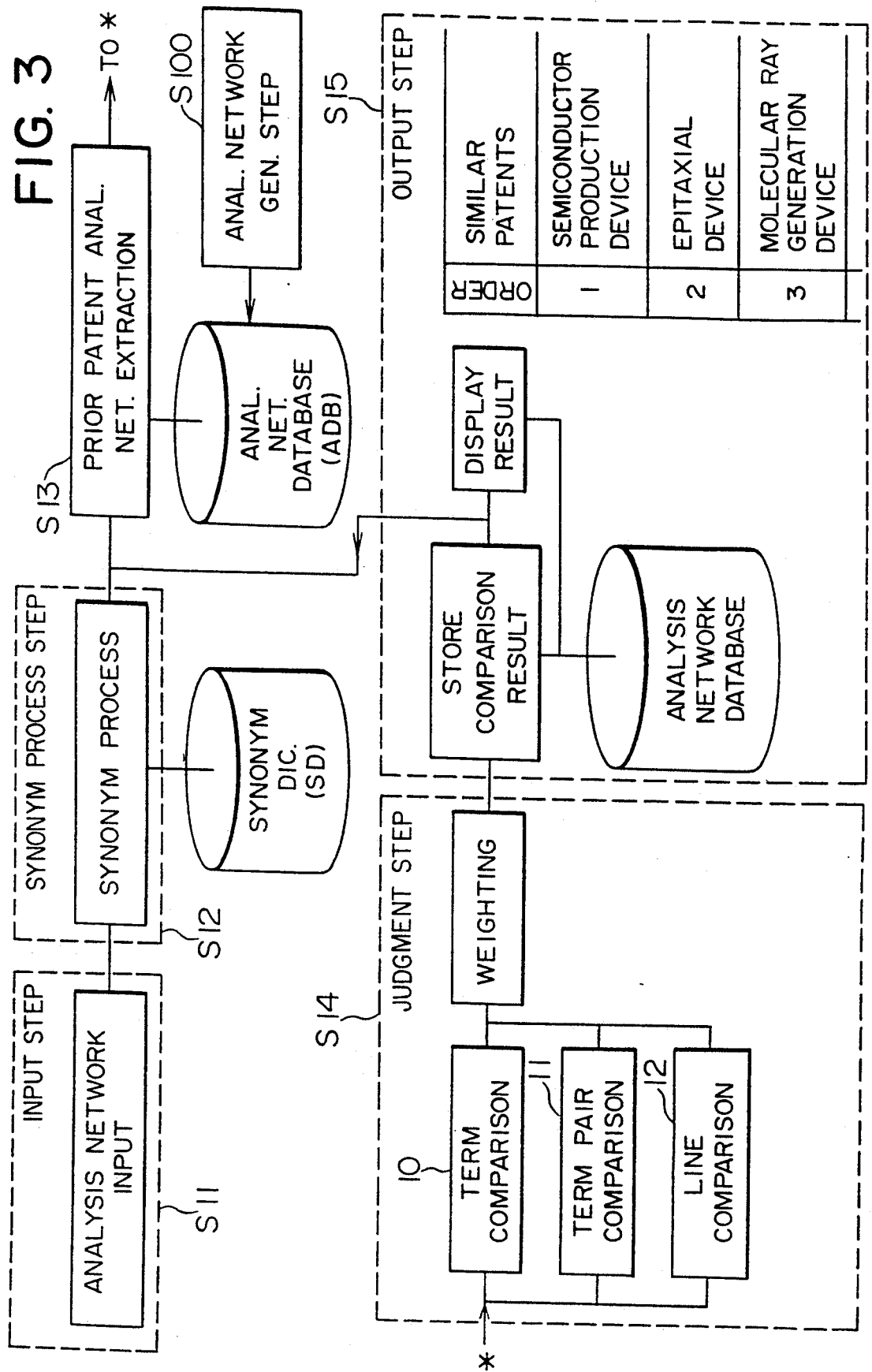
FIG. 3 is a block diagram showing the similarity judgment operations of a text similarity matching device according to this invention.

FIG. 3 is a block diagram showing the similarity judgment operations of a text similarity matching device according to this invention. Analysis network generation step S100 is effected in a manner similar to the information extraction process described above. It is assumed here that the analysis network database (ADB) is already prepared.

At the input step S11, the analysis network which forms the search condition is inputted. At the synonym/near synonym processing step S12, the inputted analysis network is subjected to synonym/near synonym processing. At the analysis network extraction step S13, those analysis networks which are related to the input analysis network are extracted form the analysis network database (ADB). At the judgment step S14, the extracted analysis networks and the input analysis network are compared with each other, to judge the similarity therebetween. At the output step S15, the result of the judgment is outputted.

Next, the operation is described in greater detail.

The analysis network for which the search is to be effected is inputted at the input step S11 via the analysis network input unit (ANI). The analysis network may either be the one inputted manually, or the one obtained via the analysis network generation steps as described above. In the case where the analysis network is inputted manually, synonyms/near synonyms are added to respective terms of the analysis network at the synonym/near synonym processing step S12. At the analysis network extraction step S13, related analysis networks (e.g., those having common entries) are extracted from the analysis network database. Further at the judgment step S14, the analysis network obtained via the input step S11 and those obtained via the analysis network extraction step S13 are compared and points are given to respective analysis networks extracted from the analysis network database (ADB). The details of the comparison operation is described by reference to FIG. 4.

FIG. 4 is a diagram showing a method of similarity judgment via the similarity judgment means. First, at the term comparison step 10, the terms of the input analysis network and those of an analysis network extracted from the analysis network database (ADB) are compared with each other, and points are given when agreements of individual terms are found. These points are referred to as the term agreement point D. Next, at the term pair comparison step 11, pairs of terms of the two analysis networks are compared, and points are given when agreements of pairs of terms are found. These points are referred to as the term pair agreement point C. The phrase "pair of terms" as used herein refers to two terms which have any relationship within the analysis network in which they are contained. Finally, at the line comparison step 12, lines of the two analysis networks are compared with each other, and points are given when agreements of lines are found. These points are referred to as the line agreement point B.

The comparison of the two analysis networks is thus completed, and the result of the comparison is stored in the analysis network database. By repeating the above process, the results of comparisons of all the relevant analysis networks of the analysis network database (ADB) are stored in the analysis network database. The total points are calculated by taking the sum of the term agreement point D, pair agreement point C, and the line agreement point B, multiplied with respective predetermined weights d, c, b. The analysis networks of the analysis network database (ADB) for which the comparison judgment has been effected are displayed in the order of the total points.

FIG. 5 shows a specific method for calculating the total points. In the case of the example shown in FIG. 5, the input analysis network 20 is compared with the analysis network A 21 and the analysis network B 22 extracted from the analysis network database (ADB). In FIG. 5, the lines of the analysis networks are labeled with reference character K with numbers for identifying the respective lines. As in the case of the analysis network shown in TABLE 10 each line contains a pair of elements and their uses. The elements and uses are labeled with reference characters A though F with numerals attached thereto (e.g., A1 and B1 in the first column of the input analysis network 20). The last column of the analysis networks are, for example, for the relations. The relations are identified by reference characters U and V with numerals.

Thus, in FIG. 5, the respective terms (elements and uses) of the analysis networks are identified with an alphabet and a numeral. It is assumed that two terms are identical when both their identifying alphabets and numerals agree. Further, when either the alphabets or the numerals agree but not both, two terms partially match. Thus, at calculation of points 23 and 24 for the database analysis network A 21 and database analysis network B 22, two points are given as agreement point when both the alphabets and numerals of the compared terms agree. One point is given when either the alphabets or the numerals of the two terms agree. A null point (0) is given when neither the alphabets nor the numerals agree.

The calculation of points 23 for the database analysis network A 21 and the calculation of points 24 for the database analysis network B 22 are effected as follows. In the term comparison step, the terms A1 and A2 of the input analysis network 20 are compared with the terms of the respective lines of the database analysis network A 21 and database analysis network B 22. In the term pair comparison step, the term pairs (A1, B1) and (A2, B2) of the input analysis network 20 are compared respectively with the term pairs of the respective lines of the database analysis network A 21 and the database analysis network B 22. In the line comparison step, the line K1 of the input analysis network 20 is compared with the respective lines of the database analysis network A 21 and the database analysis network B 22 with respect to the constituent terms thereof. In FIG. 5, total agreements are marked by a circle (two points), partial agreements by a triangle (one point), and disagreements by a cross (0 point). Assuming that the weight b, c, d as described above are each equal to 1, the total points for the database analysis network A 21 and the database analysis network B 22 are 35 and 21 points, respectively. Thus, it can be judged that the database analysis network A 21 is closer to the input analysis network 20 than the database analysis network B 22.

In the case of the embodiment of FIG. 5, each line of the analysis networks has entries for uses. In the case where entries for uses are not present within the analysis networks, the weight c for the term pair agreement point C should be set at 0. Further, even when entries for uses are present within analysis networks, the weight c may be set at 0 or at a value smaller than the weights b and d, if the entries for the uses within the analysis networks stored in the analysis network database (ADB) are incomplete or unreliable.

Furthermore, in the case where the entries of analysis networks in the analysis network database (ADB) are marked with asterisks (*) to indicate the terms are technical terms of the relevant technical field, an additional points may be given when agreements are found for those terms marked with an asterisk. For example, if the asterisk counts for 3 points, the total points are calculated by the formula: $B \times b + C \times c + D \times d +$ (number of asterisk marks) $\times 3$.

Similarly, in the case where a circle (is placed for those entries which are present within the concept template (cT), additional points may be given for those entries marked by a circle. If the circle counts for 5 points, the total points is calculated by the formula: $B \times b + C \times c + D \times d +$ (number of circles) $\times 5$. Of course, the points for the asterisks as described above may be added thereto in addition.

The judgment element change unit (JEC) (see FIG. 1) has the function of changing the weights b, c, d, and the points given to the asterisks and circles as described above. The judgment element change unit (JEC) sets these values on the basis of past experiences for the purpose of attaining a optimal judgment. Further, the judgment element change unit (JEC) may change the points given to respective terms in accordance with the words and technical terms found within dictionaries. For example, the term "neuro" may be given 10 points, while other terms are given only 3 points as described above. Under such circumstances, the similarity is judged greater when the term "neuro" is found.

By the way, in the above description, the synonym/near synonym process is used as an example of the process for related words. Thus, as shown in FIG. 1, the dictionary of related words is the synonym/near synonym dictionary (SD). However, the information device may include a thesaurus instead of the synonym/near synonym dictionary (SD). The word "thesaurus" as used herein refers to a dictionary which include terms classified in accordance with the superordinate/subordinate (broad/narrow) concept relationship, or in accordance with the relationship of articles of manufacture and their constituent parts.

TEXT SEARCH SYSTEMS

In the case of the above embodiments, analysis networks are prepared for all the texts and then are stored in the analysis network database (ADB). However, this method has certain disadvantages.

First, the similarity matching accuracy or reliability is not sufficient. Namely, in the case where the analysis networks are generated beforehand and stored in the analysis network database (ADB), it is not possible to extract all the elements and relations of the input sentences to store them as the analysis networks. Thus, the analysis networks are generated by extracting the terms which are in certain syntactical relations, as described above in relation to the Japanese postpositions and nouns and verbs. Hence, it may happen that not all the relations which are relevant for the search are accurately extracted into the analysis networks. Under such circumstances, the searches effected with respect to such analysis networks may be inaccurate and unreliable. Further, to prepare the analysis networks for all the texts consumes much time and large storage space in the analysis network database (ADB). Furthermore, if the similarity matching as described above is effected for each one of the analysis networks, the search itself takes much time.

The following embodiments aims at solving these problems. The texts for which the search is made are not stored as analysis networks. Rather, they are stored in the database as plain texts, or complemented lists consisting of plain texts and lists of complementary terms added thereto. When a search is to be effected, queries are input in the form of analysis networks. Keywords and relations are extracted from the queries. Thereafter, keyword search is first effected for the keywords with respect to the texts or the complementary term lists stored in the database. After the texts or the complementary term lists are thus selected via the keyword search, the similarity is judged by means of the syntactical and semantic analysis. Since the number of text or the complementary term lists with respect to which the similarity judgment is made is limited, and further, since the similarity judgment can be effected by paying attention to whether or not the text or the complementary term lists of the database are related to the elements of the analysis network of the query, the similarity judgment is faster and more reliable.

Next, this embodiment is described in greater detail.

Figure 6:
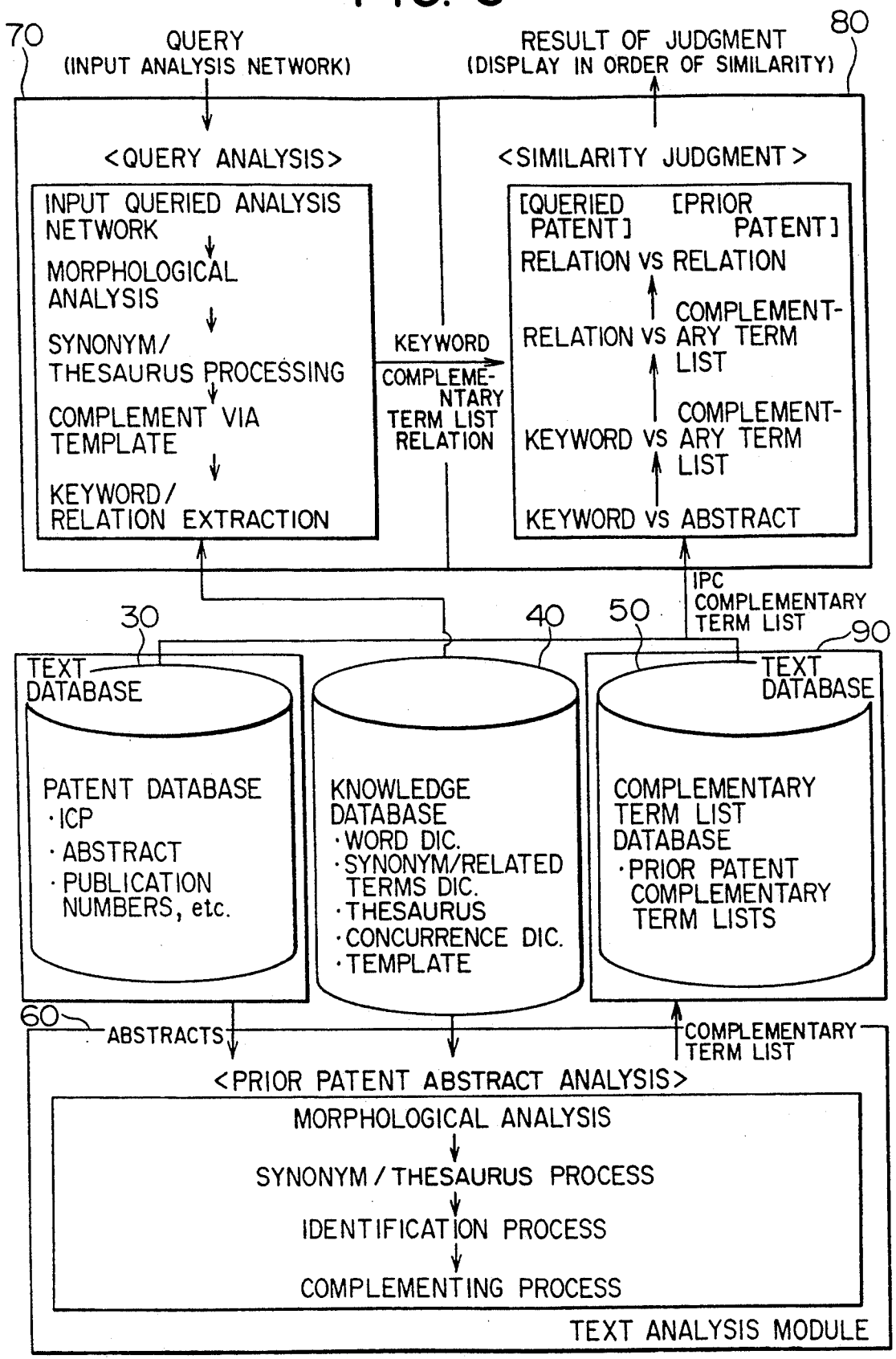
FIG. 6 is a diagram showing a text search system according to this invention.

FIG. 6 is a diagram showing a text search system according to this invention, which includes three modules: a text analysis module 60, a query analysis module 70, and a similarity judgment module 80, and a text database 90 for storing texts; the text search system further includes a knowledge database 40 for storing dictionaries and expert knowledge.

The patent database 30 of the text database 90 stores information extracted from prior patents with respect to the IPC (international patent classification), publication number, the abstract of the disclosure, etc. The knowledge database 40 stores word dictionary, synonym/near synonym/related term dictionary, thesaurus, concurrence dictionary, and template, etc. The complementary term list database 50 stores complementary term lists of the prior patents, etc, extracted from texts via text analysis. The text analysis module 60 receives abstracts of prior patents from the patent database 30, analyzes it by means of the various dictionaries of the knowledge database 40, and outputs the result to the complementary term list database 50 as the complementary term lists of the prior art patent. To the query analysis module 70 is inputted the queries (the analysis network of the queried patent) such that the related information from the patent abstract in stored in the patent database 30 and the complementary term list database 50 are searched for and retrieved. On the basis of the queries supplied from the query analysis module 70, the similarity judgment module 80 selects the related patent abstracts from the patent database 30 or the complementary term list database 50. The text database 90 consists of the patent database and the complementary term list database.

Next the operation of the text analysis module 60 is described by referring to TABLES 11, 12, and 13.

TABLE 11

ABSTRACT OF PRIOR ART PATENT
(JAPANESE VERSION)

41116    H01L 2152    H01L 2974
[Object] Handoutai switching youso wo kouseisuru chip no
shuui ni hasseisuru netuouryoku wo kanwasase, chip no hyoumen
kara ryoudenkyoku he netu wo dentatusaseru dennetu shudan wo
moukeru kotoniyori, daiyouyouka oyobi kouseinouka wo
jitugenkanou tosuru.
Denryoku you handoutai switch souti
ABSTRACT OF PRIOR ART PATENT
(IN ENGLISH TRANSLATION)

[Object] By providing a heat transfer means for
transferring heat from the surface of a chip to both electrodes
and thereby reducing the thermal stress generated around a chip
constituting a semiconductor switchinS element, the enhancement
of the capacity and performance of the device is realized.
Power semiconductor switching device

TABLE 12

ABSTRACT OF PRIOR ART PATENT
(AFTER MORPHOLOGICAL ANALYSIS)

41116    H01L 2152    H01L 2974
[Object] (noun) Handoutai switching youso / <accessory>
wo | (verb) kouseisuru [kousei suru] | (noun) chip / <accessory> no | (noun) shuui <accessory>ni | (verb) hasseisuru
[hassei suru] | (noun) netuouryoku/ <accessory> wo | (verb)
kanwasa [kanwa suru]/ <accessory> se | (comma), | (noun)

TABLE 12-continued

ABSTRACT OF PRIOR ART PATENT
(AFTER MORPHOLOGICAL ANALYSIS)

chip / <accessory> no | (noun) hyoumen / <accessory>
kara | (noun) ryoudenkyoku / <accessory>
he | (noun) netu / <accessory> wo | (verb) dentatusa
[dentatu suru] / <accessory> seru | (noun) dennetu shudan /
<accessory> wo | (verb) moukeru [mouke ru] <accessory>
kotoniyori | (comma), | (noun) daiyouryou (noun) ka |
<accessory> oyobi | (noun) kouseinou / (noun) ka / <accessory> wo | (noun) jituenkanou / <accessory> tosuru |
(period).|
(noun) Denryoku / (noun) you / (noun) handoutai / (noun)
switch / (noun) souti |

TABLE 13

ABSTRACT OF PRIOR ART PATENT (AFTER
SYNONYM/NEAR SYNONYM/THESAURUS PROCESS)

41116    H01L 2152    H01L 2974
(noun) Handoutai switching youso / <accessory> wo |
(verb) kouseisuru [kousei suru] | (noun) chip #e{device, pellet,
die, IC #c{CCD (solid state imaging element), MOS, SIS, SIT,
SOS, bi-MOS, bipolar, three-dimension, transistor, FET, substrate}, integrated circuit, cell #c{macro-cell, memory cell,
memory}, element} / <accessory> no | (noun) shuui
<accessory> ni | (verb) hasseisuru [hassei
suru] | (noun) netuouryoku/ <accessory> wo | (verb) kanwasa [kanwa suru]/ <accessory> se |
(comma), | (noun) chip #e{device, pellet, die, IC #c{CCD (solid
state imaging element), MOS, SIS, SIT, SOS, bi-MOS, bipolar,
three-dimension, transistor, FET, substrate}, integrated circuit,
cell #c{macro-cell, memory cell, memory}, element} / <accessory> no | (noun) hyoumen #c{enhancement, channel, depletion,
inverted layer} / <accessory> kara | (noun) ryoudenkyoku /
<accessory> he | (noun) netu #c{energy}/ <accessory>
wo | (verb) dentatusa [dentatu suru] / <accessory> seru |
(noun) dennetu shudan / <accessory> wo | (verb) moukeru
[mouke ru] #s{setti suru} <accessory> kotoniyori |
(comma), | (noun) daiyouryou / (noun) ka | <accessory>
oyobi | (noun) kouseinou / (noun) ka / <accessory> wo |
(noun) jituenkanou / <accessory> tosuru (period).|
(noun) Denryoku #c{electricity} #e(power / (noun) you /
(noun) handoutai / (noun) switch / (noun) souti |

The TABLE 13 is an example of prior patent abstract stored in the patent database 30. On receiving this prior art patent abstract, the text analysis module 60 adds the related terms such as synonym/near synonym of synonym/near synonym dictionary or the related terms of the thesaurus. TABLE 13 shows the prior patent complementary term list after this related term process via which the synonym/near synonym and the related terms (superordinate/subordinate terms, etc) are added.

In TABLE 13, the characters #e, #s, and #c has the following meanings:

e: synonym s: near synonym c: related terms via thesaurus

For example, in the case of this example, for the respective words taken out from the text via morphological analysis, the recursive related word processings (of depth 2) such as: (1) word (synonym (thesaurus)), and (2) word (near synonym (near synonym)) are effected. In the case of (1) above, synonyms are added for respective words, and then the words related to the synonyms via the thesaurus process are added. In the case of (2), near synonyms are added for respective words and then near synonyms of the near synonyms are added. The combination of recursive or repeated processing is not limited to the above two cases (1) and (2): arbitrary combination may be performed. Further, threefold or more than threefold repetitive processing (i.e., the combination of three or more levels of repetitive related word processing) may also be effected.

For example, for the noun "chip", the set of synonyms: {device, pellet, die, IC, integrated circuit, cell, element} are added. Further, for the verb "moukeru [provide]", the near synonym {dispose} is added. Further, for the noun "netu [heat]", the related term: {energy} is added via thesaurus.

In the case of this example, related term processing via thesaurus is effected after the synonym process, such that the words related to the synonyms via thesaurus can also be added. For example, for the "IC" added as synonym, the list of related terms via thesaurus: {CCD (solid state imaging element), MOS, SIS, SIT, SOS, bi-MOS, bipolar, three dimension, transistor, FET, substrate} are added. Further, the synonym/near synonym or the thesaurus process may be effected after the synonym/near synonym process or the thesaurus process. For example, to the verb "moukeru [provide]" the synonym {settisuru [dispose]} is added in the first process. With respect to this {settisuru [dispose]}, there are added the list of synonyms: {keiseisuru [form], tukuru [make]} in the second processing.

Next, the text analysis module 60 effects the identification process via which the respective morphemes or words prepared from the prior art patent abstract are classified into: element, use, relation, method of production, material, and function. Thereafter, the text analysis module 60 effects the complementary process. Namely, by utilizing the concurrence dictionary, the text analysis module 60 determines if the respective terms of the abstract are found in the concurrence dictionary, and the concurrent words are added to the word list of the abstract. The prior patent complementary term list is thereby completed. The text analysis module 60 effects the above processes for respective prior patent abstracts, and outputs the complementary term lists to the complementary term list database.

Next, the operation of the query analysis module 70 is described. The characteristics of the operations thereof are summarized as follows.

(1) The queries are described in terms of the relations which represent the characteristics of the technical field in question. The description is not limited to single word. Phrase and sentences are allowed.

(2) The keywords and relations appearing in the queries and the texts with respect to which the search is effected are extracted, and related terms are added to respective extracted terms via dictionaries.

(3) The expert knowledge is utilized for extracting relations from the queries and for complementing the relations to the queries.

(4) the relations among the keywords are extracted.

Further, by means of these processes are obtained: (a) the keyword set, which include keywords that are the important words among those obtained form the lexical parsing of the queries, or the words related to these important words; and (b) the relation set, which consists of relations holding between the keywords and those relations derived from the above processes (3) and (4).

Next, the operation of the query analysis module 70 is described in detail by reference to TABLE 14 through 19.

TABLE 14

ANALYSIS NETWORK OF THE QUERIED PATENT (INPUT QUERY)

File No.: AAF819

TABLE 14-continued

IPC: H01L 2184; H01L 2186
Field (0):
Object/Effect (0):
Device Kind/Use (0):
Remarks (0):
Structure (300):

| | |
|---|---|
| Structure Column (100): | element 1 (20): kiban shumen (debaisukeisei zumi) |
| | use 1 (0) |
| | element 2 (20): zetuenmaku |
| | use 2 (0): |
| | element 3 (0): |
| | use 3 (0): |
| | relation (50): element 1 no ue ni element 2 |
| Structure Column (100): | element 1 (20): zetuenmaku |
| | use 1 (0): |
| | element 2 (20): hitankesshou handoutaimaku |
| | use 2 (0): |
| | element 3 (0): |
| | use 3 (0): |
| | relation (50): element 1 no ue ni element 2 |
| Structure Column (100): | element 1 (20): hitankesshou maku |
| | use 1 (0): |
| | element 2 (20): |
| | use 2 (0): |
| | element 3 (0): |
| | use 3 (0): |
| | relation (50): hyoumen outotu + - 7.5 nn ika |
| method of production (100) | |
| method of production column (100): | method of production 1 (20): hitankesshou makuseichou |
| | condition 2 (20): laser anneal |
| | method of production 2 (0): koutakenma |
| | condition 2 (0): |
| | relation (0): |
| material (0): | |
| material 1 (0): | material (0): |
| | function (0): |
| | relation 1 2 (0): |
| material 2 (0): | material (0): |
| | function (0): |
| generation (0): | generated product (0): |
| | function (0): |

ANALYSIS NETWORK OF THE QUERIED PATENT INPUT QUERY (IN ENGLISH TRANSLATION)

File No.: AAF819
IPC: H01L 2184; H01L 2186
Field (0):
Object/Effect (0):
Device Kind/Use (0):
Remarks (0):
Structure (300):

| | |
|---|---|
| Structure Column (100): | element 1 (20): substrate main surface (device formation completed) |
| | use 1 (0) |
| | element 2 (20): insulator film |
| | use 2 (0): |
| | element 3 (0): |
| | use 3 (0): |
| | relation (50): element 2 upon element 1 |
| Structure Column (100): | element 1 (20): insulator film |
| | use 1 (0): |
| | element 2 (20): non-monocrystalline semiconductor film |
| | use 2 (0): |
| | element 3 (0): |
| | use 3 (0): |
| | relation (50): element 2 upon element 1 |
| Structure Column (100): | element 1 (20): non-monocrystalline film |
| | use 1 (0): |

TABLE 14-continued

| | |
|---|---|
| | element 2 (20):<br>use 2 (0):<br>element 3 (0):<br>use 3 (0):<br>relation (50): surface roughness + - 7.5 nn |
| method of production (100) | |
| method of production column (100): | method of production 1 (20): non-monocrystalline film growth condition 2 (20): laser annealing method of production 2 (0): steel body grinding condition 2 (0): relation (0): |
| material (0): | |
| material 1 (0): | material (0):<br>function (0):<br>relation 1 2 (0): |
| material 2 (0): | material (0):<br>function (0): |
| generation (0): | generated product (0):<br>function (0): |

TABLE 15

ANALYSIS NETWORK OF THE QUERIED PATENT (AFTER MORPHOLOGICAL ANALYSIS)

File No.: AAF819
IPC: H01L 2184; H01L 2186
Field (0):
Object/Effect (0):
Device Kind/Use (0):
Remarks (0):
Structure (300):

| | |
|---|---|
| Structure Column (100): | element 1 (20): (noun) kiban / (noun) shumen / (comment) (/( (noun) debaisukeisei <accessory> zumi \| (comment))\|<br>use 1 (0)<br>element 2 (20): (noun) zetuenmaku<br>use 2 (0):<br>element 3 (0):<br>use 3 (0):<br>relation (50): (symbol) element 1/ <accessory> no / (noun) ue / <accessory> ni/ (symbol) element 2 |
| Structure Column (100): | element 1 (20): (noun) zetuenmaku<br>use 1 (0):<br>element 2 (20): (noun) hitankesshou handoutaimaku \|<br>use 2 (0):<br>element 3 (0):<br>use 3 (0):<br>relation (50): (symbol) element 1 / <accessory> (noun) ue / <accessory> ni / (symbol) element 2 |
| Structure Column (100): | element 1 (20): (noun) hitankesshou / (noun) maku<br>use 1 (0):<br>element 2 (20):<br>use 2 (0):<br>element 3 (0):<br>use 3 (0):<br>relation (50): (noun) hyoumen / (noun) oututu (noun) + - 7.5 nn ika |
| method of production (100) | |
| method of production column (100): | method of production 1 (20): (noun) hitankesshou / (noun) makuseichou condition 2 (20): (noun) laser anneal method of production 2 (0): (noun) koutaikenma condition 2 (0): relation (0): |
| material (0): | |
| material 1 (0): | material (0):<br>function (0):<br>relation 1 2 (0): |
| material 2 (0): | material (0):<br>function (0): |
| generation (0): | generated product (0): |

TABLE 15-continued

ANALYSIS NETWORK OF THE QUERIED PATENT (AFTER MORPHOLOGICAL ANALYSIS)

| | |
|---|---|
| | function (0): |

TABLE 16

ANALYSIS NETWORK OF THE QUERIED PATENT (AFTER SYNONYM/NEAR SYNONYM/THESAURUS PROCESS)

File No.: AAF819
IPC: H01L 2184; H01L 2186
Field (0):
Object/Effect (0):
Device Kind/Use (0):
Remarks (0):
Structure (300):

| | |
|---|---|
| Structure Column (100): | element 1 (20): (noun) kiban #syn{same substrate, wafer, substrate} #thes{SOI, SOS, amorphous layer, epitaxial layer, silicon, monocrystal, quartz, insulator substrate, polycrystalline layer, IC, vapor phase growth layer, window} / (noun) shumen / (comment)(/( (noun) debaisukeise <accessory> zumi \| (comment))\|<br>use 1 (0)<br>element 2 (20): (noun) zetuenmaku #syn{insulator} #thes{field layer}<br>use 2 (0):<br>element 3 (0):<br>use 3 (0):<br>relation (50): (symbol) element 1/ <accessory> no / (noun) ue / <accessory> ni/ (symbol) element 2 |
| Structure Column (100): | element 1 (20): (noun) zetuenmaku #syn{insulator} #thes{field layer}<br>use 1 (0):<br>element 2 (20): (noun) hitankesshou handoutaimaku #syn{polycrystalline semiconductor layer}\|<br>use 2 (0):<br>element 3 (0):<br>use 3 (0):<br>relation (50): (symbol) element 1 / <accessory> (noun) ue / <accessory> ni / (symbol) element 2 |
| Structure Column (100): | element 1 (20): (noun) hitankesshou / (noun) maku<br>use 1 (0):<br>element 2 (20):<br>use 2 (0):<br>element 3 (0):<br>use 3 (0):<br>relation (50): (noun) hyoumen #thes{enhancement, channel, depletion, depletion layer, inverted layer}/(noun) oututu #thes{shape} (noun) oututu #thes{shape} (noun) + - 7.5 nn ika |
| method of production (100) | |
| method of production column (100): | method of production 1 (20): (noun) hitankesshou / (noun) makuseichou condition 2 (20): (noun) laser anneal #thes{anneal} method of production 2 (0): (noun) koutaikenma condition 2 (0): relation (0): |
| material (0): | |
| material 1 (0): | material (0):<br>function (0):<br>relation 1 2 (0): |
| material 2 (0): | material (0):<br>function (0): |
| generation (0): | generated product (0):<br>function (0): |

The TABLE 14 shows the query in the form of analysis network. In this case, the data of the queried patent is input in this form, such that the related prior patents may be searched.

The analysis network of TABLE 15 shows the structural characteristics, etc, of a semiconductor device. The analysis network is divided into the main categories of structure, method of production, and material. The entries for the structure columns include: elements 1, 2, 3, for representing the elements of structures; use 1, 2, 3, for representing the uses of the elements 1, 2, 3; and the relations among the elements 1, 2, 3. The table represents the analysis network similar to that shown in TABLE 10 in a different form. The element 3 and the use 3 are added to the analysis network of TABLE 10. The element 3 has been added to facilitate the representation of ternary relations such as "the element 3 is disposed between element 1 and element 2". When a binary relation such as "element 2 is upon element 1" is utilized, the fields for the element 3 and use 3 are left vacant. Further, whether or not the fields for the uses 1, 2, 3 are filled in is arbitrary. These fields usually remain as blanks.

The columns for the method of productions include: methods 1 and 2 for representing the methods of production; conditions 1 and 2 for representing the conditions for respective method of production; and a relation which represents the order of the processes when two methods of production are used in succession. The fields for the conditions and the relation may be left unfilled.

The columns for the materials include those for the material and function, etc. The columns for the materials are filled in during the template complement processing effected afterwards, and hence are not yet filled in the analysis network as shown in TABLE 14.

The numerals shown within the parentheses are the points. These points represent the relative importance of the respective columns. For example, in TABLE 14, the elements 1 and 2 are given 20 points, while the relations are given 50 points. Each one of the columns is given 100 points, such that the structure as a whole is given 300 points. On the other hand, the method of production is given 100 points. Thus, the similarity of two texts are judged greater when the structures are similar than when method of productions are similar.

Upon receiving an input of the queried analysis network as shown in TABLE 14, the query analysis module 70 effects the morphological analysis via the word dictionary. TABLE 15 shows the analysis network obtained after the morphological analysis. Next, the query analysis module 70 effects the synonym/near synonym/thesaurus processing. The TABLE 16 shows the queried analysis network obtained after the synonym/near synonym/thesaurus processing. In TABLE 16, the symbols #syn and #thes represent that the terms embraced by the following braces { } are the synonyms and the related words added via the synonym/near synonyms and thesaurus processing. For the sake of easier comprehension, the terms added are shown in English. The symbol #near (which does not appear in the TABLE 16) is used to represent the near synonyms which are added via the synonym/near synonym process. Synonyms/near synonyms and related words are added via the synonym/near synonym/thesaurus processing as described above.

Next, the query analysis module 70 effects the complement process via the templates in the knowledge database 40. The following TABLE 17 shows the material template as an example of the complementary template (CT), by means of which the corresponding materials (or the uses and functions) may be searched from the elements.

TABLE 17

| Pub. No. | 1st IPC cls. | general use | use (*) | element (function) (*) | material (*) | | | | |
|---|---|---|---|---|---|---|---|---|---|
| | | | | | raw material | added & included material | prod mat. | add. inc. mat. | method of production |
| P61-258 452 | | | multi-layer structure | wiring | Al, TiN, Ti Al—Si AlTi—Si Al—Zr—Si Al—Ti, Al—Zr | | | | |
| P61-258 453 | | | multi-layer wiring | wiring layer | Al, Al alloy high melting pt. metal, metal silcide. & nitr. | | | | |
| | | | | conductor column | high melting metal, metal silicide & nitride | | | | |
| P63-229 852 | | | 3-layer wiring | electrode wiring | polysilcon Ti nitride, TiN Ti silicide | | | | |
| P2-588 66 | | | | gate electrode | polysilicon tungsten silic. | | | | |
| | | | | etching gas | CH4, N2, CHF3 | | | | |
| P54-151 374 | | | | | hydrofluoric asid nitric asid ammonium fluoride | | | | wet etching |
| P56-157 024 | | | electrode | | metal silicide metal silicide polycrys. silicon | high impurity | | | |
| | | | | insulator | phos. silicide glass (PSG) | | | | |
| p61-816 68 | | | | metal gate side wall | tunsten layer oxide | | | | |

TABLE 17-continued

| Pub. No. | 1st IPC cls. | general use | use (*) | element (function) (*) | material (*) raw material | added & included material | prod mat. | add. inc. mat. | method of production |
|---|---|---|---|---|---|---|---|---|---|
| P63-23 75 | | | | dielectric film | silicon nitride, tantalum oxide, silicon oxide film | | | | |
| P59-104 156 | | | | conductor film | poly-Si Mom, Ti, W, Al | | | | |

The following TABLE 18 shows an example of the specific format for storing the material template of TABLE 17. The colons (:) are used as field separators. In the case of the TABLE 18, the format represents the material template, all the three lines of which has "insulator" as the element.

TABLE 18

MATERIAL TEMPLATE 3-1538:H01L 231205::multi-layer wiring:insulator film:SiO2::::
3-1539:H01L 21321::::insulator film:BPS,BPSG::::
3-1547:H01L 21336:thin film Tr::insulator film:SiO2, Si3N4, TaO::::CVD, sputtering The query analysis module 70 complements the queried analysis network via the complementary template (CT) of TABLE 18. The following TABLE 19 shows the queried analysis network as obtained after the complement process via the complementary template (CT), where the raw materials for the insulator film appearing in TABLE 18 are added as complements.

TABLE 19

ANALYSIS NETWORK OF THE QUERIED PATENT
(AFTER COMPLEMENT VIA TEMPLATE)

File No.: AAF819
IPC: H01L 2184; H01L 2186
Field (0):
Object/Effect (0):
Device Kind/Use (0):
Remarks (0):
Structure (300):
Structure Column (100): element 1 (20): (noun) kiban #syn{same substrate, wafer, substrate} #thes{SOI, SOS, amorphous layer, epitaxial layer, silicon, monocrystal, quartz, insulator substrate, polycrystalline layer, IC, vapor phase growth layer, window} / (noun) shumen / (comment)(/( (noun) debaisukeise <accessory> zumi | (comment))|
use 1 (0):
element 2 (20): (noun) zetuenmaku #syn{insulator} #thes{field layer}
use 2 (0):
element 3 (0):
use 3 (0):
relation (50): (symbol) element 1/ <accessory> no / (noun) ue / <accessory> ni/ (symbol) element 2
Structure Column (100): element 1 (20): (noun) zetuenmaku #syn{insulator} #thes{field layer}
use 1 (0):
element 2 (20): (noun) hitankesshou handoutaimaku #syn{polycrystalline semiconductor layer}|
use 2 (0):
element 3 (0):
use 3 (0):
relation (50): (symbol) element 1 / <accessory> (noun) ue / <accessory> ni / (symbol) element 2

TABLE 19-continued

ANALYSIS NETWORK OF THE QUERIED PATENT
(AFTER COMPLEMENT VIA TEMPLATE)

Structure Column (100): element 1 (20): (noun) hitankesshou / (noun) maku
use 1 (0):
element 2 (20):
use 2 (0):
element 3 (0):
use 3 (0):
relation (50): (noun) hyoumen #thes{enhancement, channel, depletion, depletion layer, inverted layer}/(noun) outotu #thes{shape} (noun) + - 7.5 nn ika
method of production (100)
method of production column (100): method of production 1 (20): (noun) hitankesshou / (noun) makuseichou
condition 2 (20): (noun) laser anneal #thes{anneal}
method of production 2 (0): (noun) koutaikenma
condition 2 (0):
relation (0):
material (0):
material 1 (0): material (0): SiO2 film, BPS, BPSG, SiO2, SiO3N4, TaO
function (0): insulator film
relation 1 2 (0):
material 2 (0): material (0):
function (0):
generation (0): generated product (0):
function (0):

Finally, the query analysis module 70 extracts the keywords and/or relations from the queried analysis network, and then outputs them.

By the way, in the case of the above example, the keywords and relations are extracted from the analysis network after the complementations via the template. However, they may be extracted from the analysis network after the morphological analysis or the synonym/near synonym/thesaurus processing.

Next the operation of the similarity judgment module 80 is described by reference to TABLES 20 through 22. On the basis of the analysis results obtained via the query analysis and text analysis, the similarity judgment module 80 effects the judgments and evaluations at the following four levels:

(1) The first search level:

On the basis of the keyword set which is obtained from the query analysis, a text search via keywords is effected with respect to the patent database 30, and the agreements of the keywords are judged and evaluated.

Hear, it is judged how frequently the keywords in the query occur in the respective texts of the patent database 30. Since the texts themselves are subjected to the search, the difference of the lexical division of the texts which may be generated by different analysis method does not matter. The related terms, however, cannot be searched for. The number of coincident keywords are counted, and the similarity is evaluated in accordance with this number.

The following TABLE 20 shows an example of the search and judgment results on the basis of the keywords.

TABLE 20

JUDGMENT RESULT VIA FREQUENCY OF KEYWORDS IN TEXTS
IPC: 'H01L 218'
keywords: 'less than +-7.5 nn, device formation, laser anneal, rough substrate, steel grinding, main surface, on, insulator film, non-monocrystalline, non-monocrystalline semiconductor film, surface, film, film growth'

| order:publication number:number of coincident keywords |
|---|
| No. 1:01548:6 |
| No. 2:00565:4 |
| No. 3:41979:4 |
| No. 4:41971:4 |
| No. 5:41076:4 |
| No. 6:41077:4 |
| No. 7:41058:4 |
| No. 8:42114:4 |
| No. 9:42952:4 |
| No. 10:42003:4 |
| No. 11:42075:4 |
| No. 12:42168:4 |
| No. 13:42755:4 |
| No. 14:42724:4 |
| No. 15:00083:3 |
| No. 16:01184:3 |
| No. 17:01814:3 |

For easier comprehension, the keywords are shown in English. By means of the keyword extraction process with respect to the queried analysis network after the morphological analysis via the query analysis module 70, fourteen (14) keywords as shown in TABLE 20 are extracted. The abstracts of the patent database (PDB) are subjected to search with respect to these 14 keywords. The patent No. 1 has the maximum frequency, 6, of occurrences of keywords. The following 13 patents Nos. 2 through 14 has the keyword occurrence frequency of four (4).

The following TABLE 21 shows an example of the search and judgment results via the keywords extracted from the queried analysis network after the synonym/near synonym/thesaurus process.

TABLE 21

JUDGMENT RESULT VIA FREQUENCY OF KEYWORDS IN TEXTS (AFTER THE SYNONYM/NEAR SYNONYM/THESAURUS PROCESSING)
IPC: 'H01L 218'
keywords: 'less than +-7.5 nn, IC, SOI, SOS, anneal, amorphous layer, wafer, wafer-epitaxial layer, enhancement, substrate, silicon monocrystal, channel, device formation, depletion, field film, laser anneal, rough substrate, vapor growth layer, depletion layer, shape, steel grinding, main surface, on, quartz insulator substrate, insulator layer, insulator film, window, polycrystalline layer, polycrystalline semiconductor layer, same substrate, inverted layer, non-monocrystalline, non-monocrystalline semiconductor film, surface, film, film growth'

| order:publication number:number of coincident keywords |
|---|
| No. 1:01548:6 |
| No. 2:41979:5 |
| No. 3:41077:5 |
| No. 4:42952:5 |
| No. 5:42156:5 |
| No. 6:00565:4 |
| No. 7:41971:4 |
| No. 8:41078:4 |
| No. 9:41057:4 |
| No. 10:41076:4 |
| No. 11:41078:4 |
| No. 12:41058:4 |
| No. 13:42900:4 |

TABLE 21-continued

JUDGMENT RESULT VIA FREQUENCY OF KEYWORDS IN TEXTS (AFTER THE SYNONYM/NEAR SYNONYM/THESAURUS PROCESSING)
IPC: 'H01L 218'
keywords: 'less than +-7.5 nn, IC, SOI, SOS, anneal, amorphous layer, wafer, wafer-epitaxial layer, enhancement, substrate, silicon monocrystal, channel, device formation, depletion, field film, laser anneal, rough substrate, vapor growth layer, depletion layer, shape, steel grinding, main surface, on, quartz insulator substrate, insulator layer, insulator film, window, polycrystalline layer, polycrystalline semiconductor layer, same substrate, inverted layer, non-monocrystalline, non-monocrystalline semiconductor film, surface, film, film growth'

| order:publication number:number of coincident keywords |
|---|
| No. 14:42057:4 |
| No. 15:42114:4 |
| No. 16:42745:4 |
| No. 17:42003:4 |
| No. 18:42090:4 |
| No. 19:42075:4 |
| No. 20:42168:4 |
| No. 21:42755:4 |
| No. 22:42724:4 |
| No. 23:00742:3 |
| No. 24:00083:3 |
| No. 25:01184:3 |
| No. 26:01814:3 |
| No. 27:41978:3 |
| No. 28:41059:3 |
| No. 29:41050:3 |
| No. 30:41033:3 |
| No. 31:41077:3 |
| No. 32:41082:3 |

The TABLE 21 shows the case where thirty-nine (39) keywords are extracted from the analysis network after the synonym/near synonym/thesaurus process. The abstracts of patents are subjected to search with respect to these 39 keywords. The No. 1 patent has eight occurrences of the keywords. The following four patents Nos. 2 through 5 have five occurrences.

(2) The second search level:

The agreements of the keyword set and the complementary term list obtained respectively from the query analysis and the text analysis are evaluated.

At this second level, the complementary term list database containing complementary term lists corresponding to the texts stored in the patent database (PDB) are searched, such that the agreements or coincidences of the keywords including related words can be evaluated. For the purpose of making the difference clear between two kinds of agreements: the agreement of the keywords added as the related words and the agreements of the original keywords, the evaluation is effected with distinct weights upon the points given to the agreements.

The following TABLE 22 shows an example of the search and judgment results via the keywords extracted from the queried analysis network, wherein the keywords are extracted from the respective columns of the structure, the method of production, and the material of the analysis network after the synonym/near synonym/thesaurus processing, and the complementary term list database is searched on the basis of these keywords.

TABLE 22

JUDGMENT RESULT VIA AGREEMENTS OF KEYWORDS AFTER SYNONYM/NEAR SYNONYM/THESAURUS PROCESSING WITH RESPECT TO COMPLEMENTARY TERM LIST
IPC: 'H01L 218' order:publication number:similarity points

No. 1:42447:293
No. 2:01548:280
No. 3:42841:274
No. 4:43424:271
No. 5:42676:265
No. 6:42035:265
No. 7:42699:264
No. 8:42734:262
No. 9:00083:259
No. 10:42699:257
No. 11:41051:256
No. 12:42094:255
No. 13:42155:251
No. 14:41059:251
No. 15:41077:249
No. 16:41087:249
No. 17:41114:246
No. 18:42713:246
No. 19:43508:246
No. 20:42117:245
No. 21:42427:245
No. 22:42915:244
No. 23:42643:243
No. 24:41228:242
No. 25:43548:242
No. 26:41077:242
No. 27:42643:242
No. 28:41083:241
No. 29:42906:241
No. 30:42037:241
No. 31:42831:240

The similarity points in the TABLE 22 are calculated as follows. When agreements of the keywords in the respective columns of the queried analysis network are found, the respective points of the columns are added. The similarity points are calculated by giving distinct weights for the respective cases where the agreements of the keywords of the queried analysis network and the keywords of the complementary term list are with respect to synonyms, near synonyms, or partial agreements of the text strings, and then are added together.

(3) The third search level:

The agreements of keywords are judged and evaluated between the relation set obtained from the query analysis and the complementary term list of the patent abstracts obtained via text analysis.

The keywords and their relations obtained from the query analysis are utilized and the agreements in complementary term list are searched by means of these keyword relations. For example, if the keywords 1 and 2 obtained via keyword analysis have the relation A, the complementary term list is searched with respect to the occurrences of the triplet of the keywords 1 and 2 and the relation A. The search is made with respect to the complementary term lists of the texts found out at the first search level (1) or those found out at the second search level (2). The complementary term lists of the texts found out at the first level, which include lexically divided words of the texts and terms related to said words, are prepared by the similarity judgement module 80.

(4) The fourth search level

The agreements of the relation sets obtained respectively from the query and the text analysis are judged and evaluated.

This fourth search judges the semantic agreements of relations with respect to the texts for which the agreements are found by the third search (3) above. Namely, the texts of the patents, etc, are subjected to syntactical and semantic analysis to obtain the relation sets thereof, and after confirming the existence of the agreements of relations as found via the third search (3), these agreements of relations as found via the third search (3) are evaluated and judged still more accurately.

Figure 7:
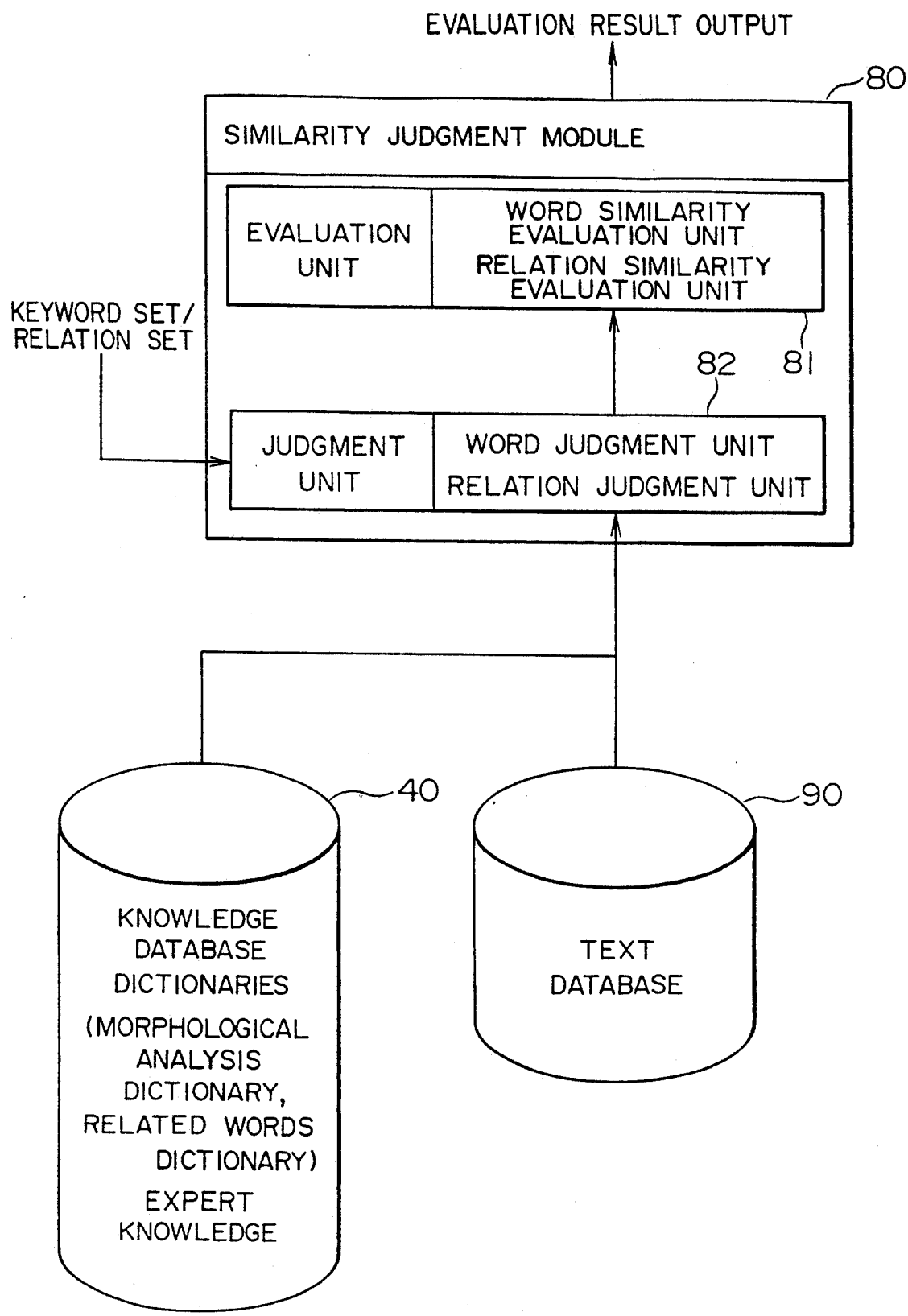
FIG. 7 is a block diagram showing the organization of a similarity judgment module of FIG. 6.

FIG. 7 is a block diagram showing the organization of a similarity judgment module of FIG. 6. The similarity judgment module 80 consists of an evaluation unit 81 and a judgment unit 82. The judgment unit 82 includes: the word judgment unit for judging the similarity of the words contained in the queries and the texts; and relation judgment unit for judging the similarity between the relations. On the other hand, the evaluation unit 81 evaluates the similarity between the queries and the respective texts. The evaluation unit 81 includes: a word similarity evaluation unit for evaluating the similarity between words; and a relation similarity evaluation unit for evaluating the similarity between relations.

The text search system has been described above with respect to the database of technical literature from which the texts similar to the query are searched for. According to this text search system, the relations among the technical terms of respective technical fields are represented via relations, and the similarity of relations is judged and evaluated. The queries are described on the basis of the relations, such that preprocessing the queries are feasible.

In the case of the above embodiments, the related words are those added via the synonym/near synonym/thesaurus process. However, related words may include those added by similar processes. It is further noted that the text search system is not limited to searches for technical texts. By generalizing the relations describing the queries, this text search system is applicable to other kinds of text searches.

What is claimed is:

1. A text search system comprising:
   (a) a text database storing texts to be searched;
   (b) a complementary term list database storing complementary term lists obtained from said texts via morphological analysis, each complementary term list including lexically divided words of one of said texts and terms related to said words;
   (c) query analysis means for receiving an input query and outputting sets of keywords and relations between keywords contained in said input query;
   (d) first search means for searching said text database with respect to said keywords obtained by said query analysis means, said first search means counting frequency of said keywords in respective texts stored in said text database and outputting texts in which said keywords occur at a frequency above a predetermined level;
   (e) second search means for searching said complementary term list database with respect to said keywords obtained by said query analysis means, said second search means calculating similarity points of respective complementary term lists on the basis of weighted sum of frequency of said keywords in said respective complementary term lists, said second search means outputting complementary term lists having similarity points above another predetermined level;

(f) complementary term list generating means for generating complementary term lists of texts in response to said texts outputted from said first search means;

(g) third search means for searching among complementary term lists outputted from said second search means and said complementary term list generating means, for occurrences of said sets of keywords and relations outputted from said query analysis means.

2. A text search system as claimed in claim 1, further comprising:

(h) similarity judgment means for judging similarity of sets of keywords and relations by means of syntactical and semantic analysis, said similarity judgment means judging similarity between sets of keywords and relations outputted from said query analysis means and sets of keywords and relations which are found by said third search means in complementary term lists outputted from said second search means and said complementary term list generating means.

3. A text search system as claimed in claim 1, wherein said first search means includes means for adding synonyms/near synonyms to said keywords and counts frequency of said keywords and said synonyms/near synonyms thereof in respective texts stored in said text database.

4. A text search system comprising:

(a) keyword means for extracting keywords by means of morphological analysis from at least two texts to be matched;

(b) related word means for adding related words, including synonyms/near synonyms and thesaurus entries, to said keywords extracted from at least one of said texts, said related words and said keywords having associated therewith weighted degrees of similarity;

(c) judgment means for judging agreement of the keywords of one of said two texts with keywords of another one of said two texts; and (d) evaluation means for evaluating similarity of keywords judged by said judgment means to agree with each other, said evaluation means including at least one of:

(d1) first evaluation means for changing weights of degrees of similarity in accordance with whether respective keywords judged by said judgment means to agree with each other are keywords extracted by said keyword means and keywords added by said related word means;

(d2) second evaluation means for changing weights of degrees of similarity when said agreements of keywords are partial agreements including forward, backward, and middle partial agreements, or (d3) third evaluation means for changing weights of degrees of similarity in accordance with points of importance given beforehand to said keywords.

5. A text search system comprising:

a text database storing texts to be searched;

a knowledge database storing a word dictionary, a synonyms/related terms dictionary and a thesaurus;

means for performing morphological analysis so as to produce complementary term lists;

a complementary term list database for storing complimentary term lists generated from the text database and the knowledge database by the means for performing morphological analysis;

query analysis means for producing an output based on morphological analysis of a user defined input query; and judgment means for receiving the output produced by the query analysis means, records from the text database and complementary term lists from the complementary term list database, the judgment means including means for judging similarity therebetween.

6. A text search system as recited in claim 5, wherein the query analysis means further comprises:

means for extracting keyword relationships based on the contents of the knowledge database.

7. A text search system as recited in claim 5 the query analysis means further comprising:

means for producing the output, wherein the output produced is a keyword complementary term list derived from the input query and the contents of the knowledge database.

8. A text search system as recited in claim 7, the judgment means further comprising:

means for judging similarity between the keyword complementary term list produced by the query analysis means and keywords in complementary term lists stored by the complementary term list database.

* * * * *